(12) United States Patent
Pan

(10) Patent No.: US 11,781,765 B2
(45) Date of Patent: Oct. 10, 2023

(54) AIR PURIFIER

(71) Applicant: X. J. Electronics (Shenzhen) Co., Ltd., Shenzhen (CN)

(72) Inventor: Yun Pan, Shenzhen (CN)

(73) Assignee: X. J. Electronics (Shenzhen) Co., Ltd., Shenzhen (CN)

( * ) Notice: Subject to any disclaimer, the term of this patent is extended or adjusted under 35 U.S.C. 154(b) by 388 days.

(21) Appl. No.: 17/160,644

(22) Filed: Jan. 28, 2021

(65) Prior Publication Data

US 2021/0356151 A1 Nov. 18, 2021

(30) Foreign Application Priority Data

May 18, 2020 (CN) .......................... 202020830674.5
May 18, 2020 (CN) .......................... 202020830859.6

(51) Int. Cl.
*F24F 8/80* (2021.01)
*F24F 8/108* (2021.01)
(Continued)

(52) U.S. Cl.
CPC ................ *F24F 8/80* (2021.01); *F24F 8/108* (2021.01); *F24F 8/22* (2021.01); *F24F 8/30* (2021.01); *F24F 8/98* (2021.01); *F24F 11/89* (2018.01); *F24F 13/10* (2013.01); *F24F 13/20* (2013.01); *F24F 2110/10* (2018.01); *F24F 2110/20* (2018.01); *F24F 2110/66* (2018.01); *F24F 2110/70* (2018.01); *F24F 2110/72* (2018.01); *F24F 2110/74* (2018.01)

(58) Field of Classification Search
CPC ........ F24F 8/80; F24F 8/30; F24F 8/98; F24F 8/22; F24F 8/108; F24F 11/89; F24F 13/10; F24F 13/20; F24F 2110/20; F24F 2110/70; F24F 2110/72; F24F 2110/74; F24F 2110/66; F24F 2110/10; F24F 7/007; B01D 46/0002
USPC ........................................................... 96/224
See application file for complete search history.

(56) References Cited

U.S. PATENT DOCUMENTS

| 2005/0172816 A1* | 8/2005 | Son | B01D 46/0013 |
| | | | 96/417 |
| 2007/0034082 A1* | 2/2007 | Adair | B03C 3/155 |
| | | | 96/97 |

FOREIGN PATENT DOCUMENTS

| CN | 107940593 A | * | 4/2018 | ............. F24F 13/14 |
| CN | 209042640 U | * | 6/2019 | |
| JP | H0949500 A | * | 2/1997 | |

* cited by examiner

*Primary Examiner* — Robert A Hopkins
*Assistant Examiner* — Qianping He
(74) *Attorney, Agent, or Firm* — Westbridge IP LLC

(57) ABSTRACT

The application provides an air purifier comprising a shell assembly having air inlets and air outlets, and a filter assembly, an air inflow guide assembly, a fan and a diffusion air outflow assembly sequentially arranged from back to front. The filter assembly can purify air entering the filter assembly via the air inlets and flowing through the filter assembly. The air inflow guide assembly defines a guide channel between the filter assembly and the fan. The fan generates an air flow that flows into a first receiving cavity via the air inlets and sequentially flows through each assembly. The diffusion air outflow assembly can rotate to guide the air flow to the air outlets, enable the air flow to diffuse outwards and decrease the flow velocity of the air flow. The air purifier expands the purification range of the air purifier and improves the purification effect of the air purifier.

18 Claims, 17 Drawing Sheets

(51) Int. Cl.
    *F24F 8/22*           (2021.01)
    *F24F 8/98*           (2021.01)
    *F24F 8/30*           (2021.01)
    *F24F 11/89*         (2018.01)
    *F24F 13/10*         (2006.01)
    *F24F 13/20*         (2006.01)
    *F24F 110/74*       (2018.01)
    *F24F 110/10*       (2018.01)
    *F24F 110/20*       (2018.01)
    *F24F 110/66*       (2018.01)
    *F24F 110/70*       (2018.01)
    *F24F 110/72*       (2018.01)

AIR PURIFIER

CROSS-REFERENCE TO RELATED APPLICATIONS

The application claims priority to Chinese patent applications CN202020830674.5 and CN202020830859.6, filed on May 18, 2020, the entire contents of which are incorporated herein by reference.

TECHNICAL FIELD

The application belongs to the technical field of air purification equipment, in particular to an air purifier.

BACKGROUND

Air purifiers can purify air by removing dust, organic volatile matter, microorganisms and unpleasant odors. Traditional air purifiers which allow air to flow in from the back side and allow purified air to flow out from two sides, or allow air to flow in from two sides and allow purified air to flow out from the top side have the defect that purified air discharged by the air purifiers will be sucked into the air purifiers via an air inlet to be purified again before being radiated around, so that the purification range of the air purifiers is narrow, and the air purification effect of the air purifiers is poor.

SUMMARY

The objective of the embodiments of the application is to provide an air purifier to solve the technical problems of narrow purification range and poor purification effect of existing air purifiers.

To fulfill the above objective, the technical solution adopted by the application is as follows: an air purifier comprises a shell assembly formed with a first receiving cavity, wherein multiple air inlets communicated with the first receiving cavity are formed in a back side of the shell assembly, and multiple air outlets communicated with the first receiving cavity are formed in a front side of the shell assembly; the air purifier further comprises a filter assembly, an air inflow guide assembly, a fan and a diffusion air outflow assembly which are sequentially arranged in the first receiving cavity from back to front, wherein, the filter assembly is able to purify air entering the first receiving cavity via the air inlets and flowing through the first receiving cavity, the air inflow guide assembly defines a guide channel between the filter assembly and the fan, the fan generates an air flow which flows into the first receiving cavity via the air inlets and sequentially flows through the filter assembly, the guide channel, the fan and the diffusion air outflow assembly, and the diffusion air outflow assembly is able to rotate to guide the air flow to the air outlets, enable the air flow to diffuse outwards and decrease the flow velocity of the air flow.

In one embodiment, the diffusion air outflow assembly comprises a diffusion component connected to the fan and an extension component connected to a back side of the diffusion component, multiple diffusion ports which penetrate through the diffusion component and are distributed in a circular array are formed in the back side of the diffusion component, have a sectional dimension becoming larger gradually from back to front, and are able to change the flow direction of the air flow, decrease the flow velocity of the air flow and increase the pressure of the air flow, and extension ports which penetrate through the extension component and are connected to the diffusion ports are formed in a back side of the extension component, have a sectional dimension becoming larger gradually from back to front, and are used to guide the air flow to extend outwards to flow to the diffusion ports.

In one embodiment, the air inflow guide assembly comprises an air collection structure and a guide structure connected to a front side of the air collection structure, an air collection port leading to the filter assembly is formed in a front side of the air collection structure and has a sectional dimension becoming smaller gradually from front to back, a guide port communicated with the air collection port is formed in a front side of the guide structure and has a sectional dimension becoming larger gradually from back to front, and the air collection port and the guide port form the guide channel jointly.

In one embodiment, the maximum sectional dimension of the guide port corresponds to the dimension of the fan.

In one embodiment, the air purifier further comprises an air detection assembly connected to the shell assembly and used for detecting the quality of air.

In one embodiment, the air detection assembly comprises a dust sensor, a VOC sensor, a temperature sensor, a humidity sensor, a formaldehyde sensor, a carbon monoxide sensor, a carbon dioxide sensor and/or an ozone sensor.

In one embodiment, a detection accommodating cavity for accommodating the air detection assembly is formed in a left side and/or right side of the shell assembly and has an access port communicated with the outside, and the air purifier further comprises an access door connected to the shell assembly and used for opening or closing the access port.

In one embodiment, the air purifier further comprises an ultraviolet sterilization component connected to the air inflow guide assembly and used for sterilizing the fan.

In one embodiment, the air purifier further comprises an anion generator and/or a plasma generator connected to the diffusion air outflow assembly.

In one embodiment, the shell assembly comprises a shell body and a back cover detachably connected to a back side of the shell body, the shell body has a first accommodating cavity which is open backwards and a second accommodating cavity which is located in front of the first accommodating cavity, the first accommodating cavity is used for accommodating the filter assembly, the second accommodating cavity is used for accommodating the air inflow guide assembly, the fan and the diffusion air outflow assembly and is communicated with the first accommodating cavity through the air inflow guide assembly, and the first accommodating cavity and the second accommodating cavity form the first receiving cavity jointly.

In one embodiment, the air purifier further comprises a male connecting assembly, and the male connecting assembly comprises:

a male base formed with a second receiving cavity and is also formed, in a connecting direction, with a connecting hole and a male hole which are spaced apart from each other and penetrating through the second receiving cavity to the outside;

a male terminal made of a conducting material and located in the second receiving cavity; and a link structure located in the second receiving cavity and provided with a first link part and a second link part, wherein the first link part is opposite to the connecting hole in the connecting direction; when an external connecting structure is disposed in the connecting hole, the first link part is pressed by the connecting structure to move away from the connecting hole to reach a connecting position, the second link part is linked with the first link part and drives, when the first link part moves to the connecting position, the male terminal to at least partially stretch out of the second receiving cavity via the male hole.

In one embodiment, the first link part and the second link part are connected and are able to rotate synchronously around a link axis, wherein the first link part and the second link part are arranged on two sides of the link axis respectively, and the second link part abut against a side, away from the male hole, of the male terminal.

In one embodiment, the male connecting assembly further comprises at least one connecting cover capable of sliding in the connecting hole in the connecting direction and at least one elastic part elastically connected between the connecting cover and the bottom of the connecting hole.

In one embodiment, the male base is further formed with an accommodating groove located beside the male hole, and the male connecting assembly further comprises a dust cover which is in a closed state or an open state; in the closed state, the dust cover covers the male hole and the accommodating groove; and in the open state, the dust cover opens the male hole and is accommodated in the accommodating groove.

In one embodiment, the male connecting assembly further comprises a male sensor for realizing signal connection, and the male sensor is a signal transmitter or a signal receiver.

In one embodiment, the air purifier further comprises a female connecting assembly matched with the male connecting assembly, wherein the female connecting assembly comprises:
  a female base formed with a female hole opposite to the male hole in the connecting direction and provided with a connecting protrusion opposite to the connecting hole in the connecting direction, wherein the connecting protrusion is inserted into the connecting hole and is used to press the first link part to the connecting position;
  a female terminal made of a conducting material, located in the female hole and electrically connected to the male terminal; and
  a female sensor aligned to the male sensor in the connecting direction and in signal connection with the male sensor, wherein when the male sensor is the signal transmitter, the female sensor is the signal receiver; and when the male sensor is the signal receiver, the female sensor is the signal transmitter.

In one embodiment, the female sensor is an infrared sensor.

In one embodiment, the air purifier further comprises a female connecting assembly matched with the male connecting assembly, wherein the female connecting assembly comprises:
  a female base formed with a female hole opposite to the male hole in the connecting direction and provided with a connecting protrusion opposite to the connecting hole in the connecting direction, wherein the connecting protrusion is inserted into the connecting hole and is used to press the first link part to the connecting position; and
  a female terminal made of a conducting material, located in the female hole and electrically connected to the male terminal.

In one embodiment, the female terminal is electrically connected to an external electrical connector, the female base is formed with a wiring trough for guiding the external electrical connector, and the wiring trough is communicated with the female hole.

The application has the following beneficial effects:

When the air purifier provided by the embodiment of the invention works, outside air enters the first receiving cavity via the air inlets in the back side of the first receiving cavity under the effect of the fan and is purified by the filter assembly, then purified air is collected and guided by the air inflow guide assembly to flow to the fan and is shunted by the fan to flow to the diffusion air outflow assembly, and afterwards, the diffusion air outflow assembly changes the flow direction, the flow velocity and the pressure of the air flow by means of rotary diffusion, so that the comfortable purified air can extends outwards and is finally discharged via the air outlets in the front side of the first receiving cavity. The air purifier provided by the embodiments of the application allows air to flow in from the back side and allows purified air to flow out from the front side, and air discharged from the front side has to flow around at least the entire air purifier to be sucked into the air purifier again via the air inlets, so that the purification range of the air purifier is expanded to some extent, and the purification effect of the air purifier is guaranteed and improved. In addition, the diffusion air outflow assembly of the air purifier enables the purified air to extend outwards to further expand the radiation range of the purified air discharged by the air purifier, so that the purification effect of the air purifier is further improved.

BRIEF DESCRIPTION OF DRAWINGS

To more clearly explain the technical solutions of the embodiments of the application, the drawings used for describing the embodiments of the application or the prior art are briefly introduced below. Obviously, the drawings in the following description are merely for some embodiments of the application, and those ordinarily skilled in the art can obtain other drawings according to the following ones without creative labor.

DETAILED DESCRIPTION OF THE EMBODIMENTS

To gain a better understanding of the technical issue to be settled by the application as well as the technical solutions and beneficial effects of the application, the application is further expounded below in conjunction with the accompanying drawings and embodiments. It should be understood that the specific embodiments described herein are merely used to explain the application, and are not intended to limit the application.

It should be noted that terms such as "length", "width", "upper", "lower", "front", "back", "left", "right", "vertical", "horizontal", "top", "bottom", "inner" and "outer" in the description of the application are used to indicate directional or positional relations on the basis of the drawings merely for the purpose of facilitating and simplifying the description of the application, do not indicate or imply that devices or elements referred to must be in a specific direction or be configured or operated in a specific direction, and thus should not be construed as limitations of the application.

Figure 1:
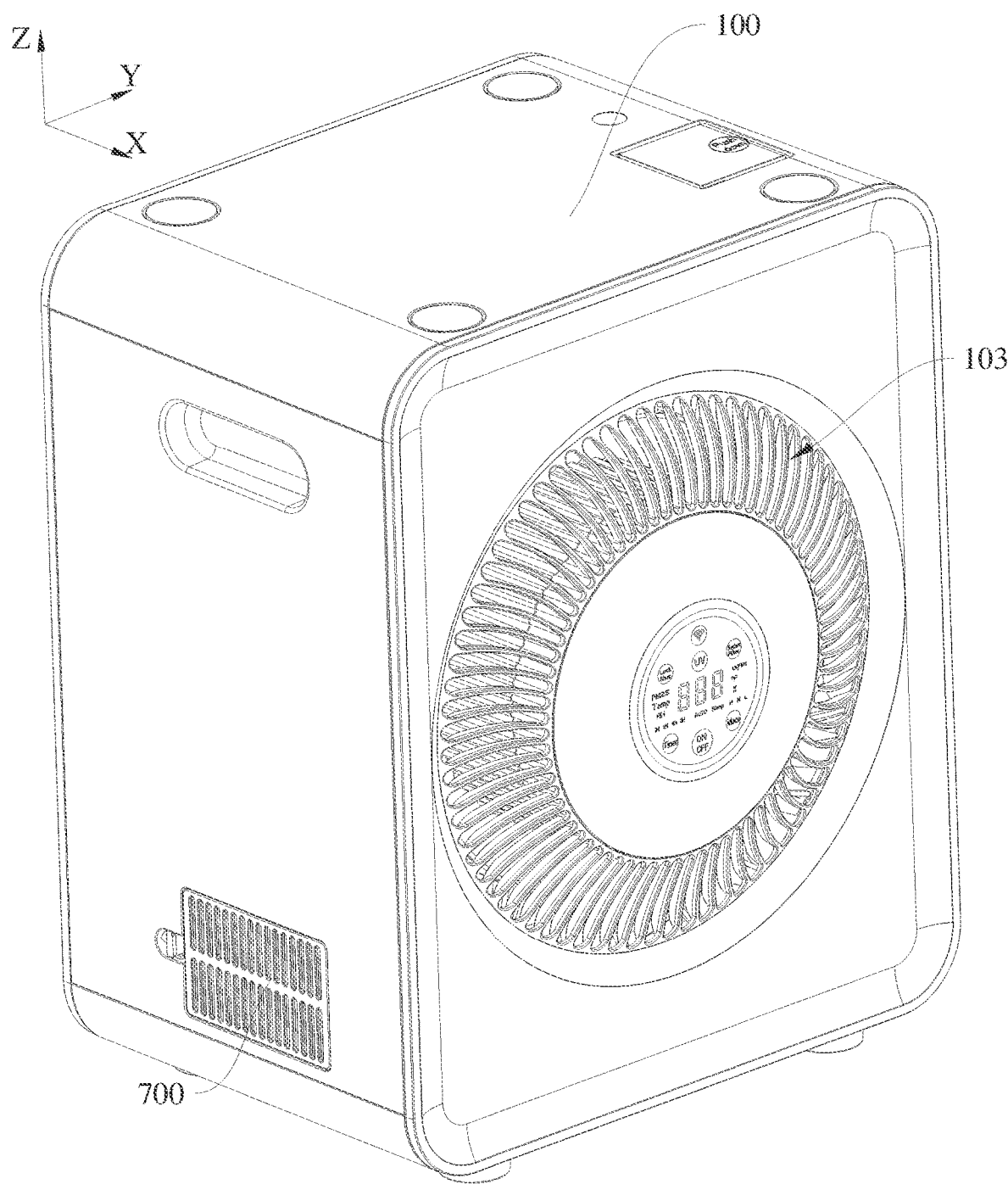
FIG. 1 a first perspective view of an air purifier provided by an embodiment of the application.

It should also be noted that in the embodiments of the application, on the basis of the XYZ rectangular coordinate system established in FIG. 1, the side in a positive direction of the X-axis is defined as a front side, and the side in a negative direction of the X-axis is defined as a back side; the side in a positive direction of the Y-axis is defined as a left side, and the side in a negative direction of the Y-axis is defined as a right side; the side in a positive direction of the Z-axis is defined as an upper side, and the side in a negative direction of the Z-axis is defined as a lower side.

In addition, the terms "first" and "second" are merely for the purpose of description, and do not indicate or imply the relative importance or implicitly indicate the number of technical features referred to. Thus, in case where a feature defined by "first" or "second", it may explicitly or implicitly indicate that one or more said features are included. In the description of the application, "multiple" refers to two or more, unless otherwise specifically defined.

In the application, unless otherwise expressly stated or defined, the terms such as "install", "joint", "connect" and "fix" should be broadly understood. For example, "connect" may refer to fixed connection, detachable connection or integral connection, or mechanical connection or electrical connection, or direct connection or indirect connection via an intermediate, or internal communication of two elements or interaction of two elements. Those ordinarily skilled in the art can appreciate the specific meaning of these terms in the application as the case may be.

The specific implementation of the application will be described in further detail below in conjunction with specific embodiments.

It should be noted at first that to facilitate the description, the expressive term "work device" is introduced below. The "work device" may refer to any device that can realize certain functional work, such as an air purifier and a humidifier. Those ordinarily skilled in the art may appreciate the specific meaning of the "work device" in this application as the case may be.

Figure 2:
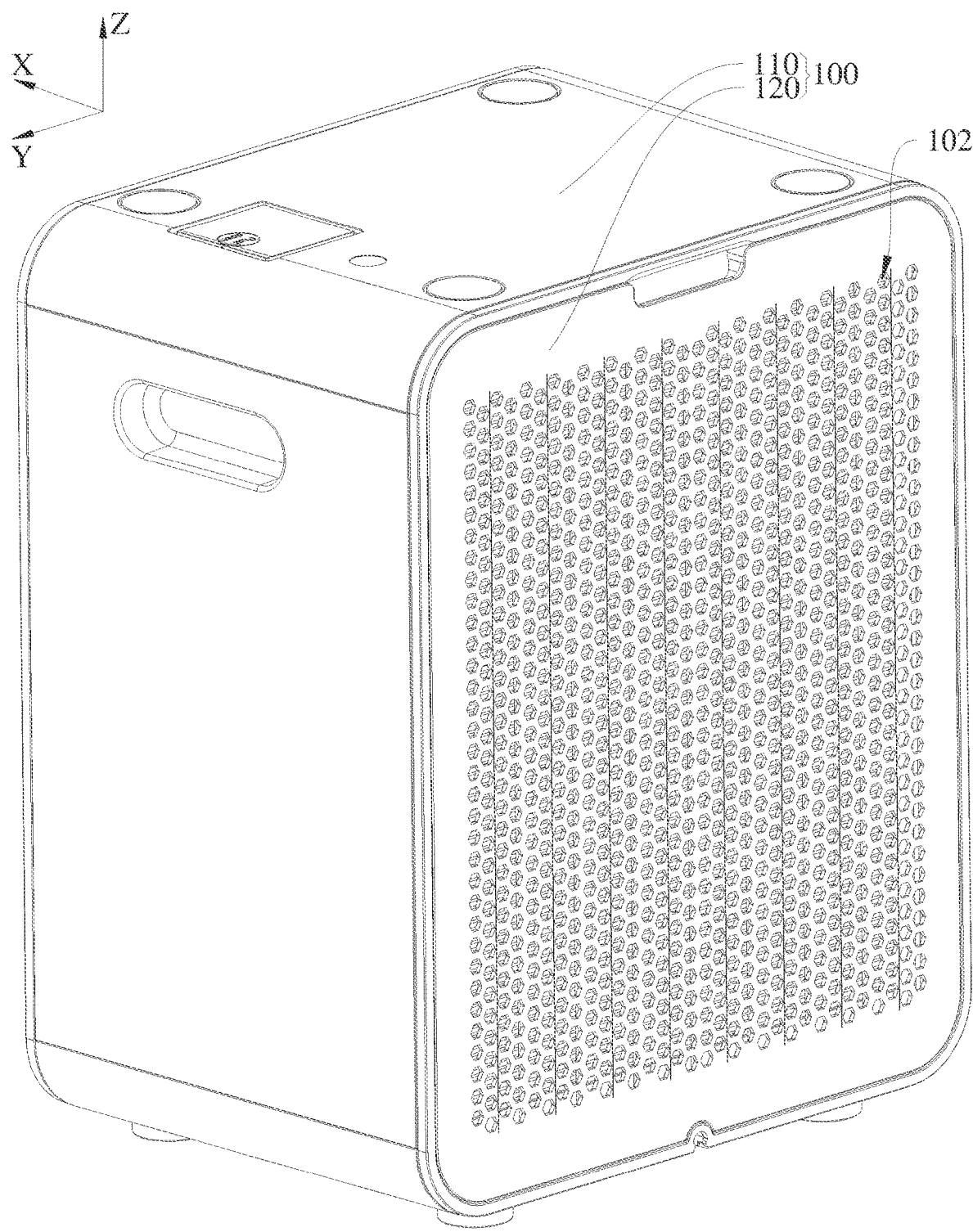
FIG. 2 is a second perspective view of the air purifier in FIG. 1.
Figure 3:
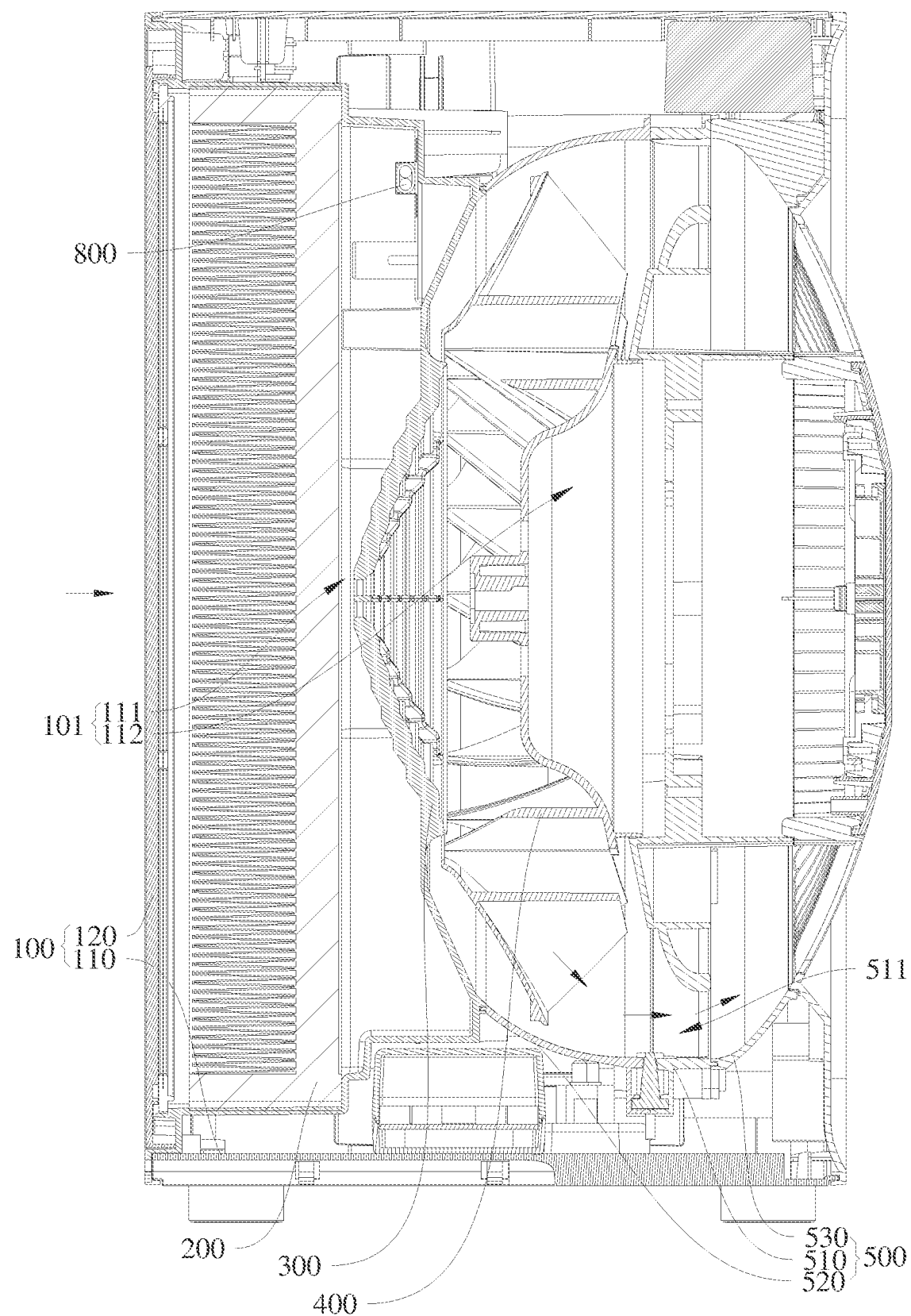
FIG. 3 is a sectional view of the air purifier in FIG. 1.

Referring to FIG. 1, FIG. 2 and FIG. 3, an embodiment of the application provides an air purifier which comprises a shell assembly 100. A first receiving cavity 101 is formed in the shell assembly 100, multiple air inlets 102 communicated with the first receiving cavity 101 are formed in a back side of the shell assembly 100, and multiple air outlets 103 communicated with the first receiving cavity 101 are formed in a front side of the shell assembly 100. The air purifier further comprises a filter assembly 200, an air inflow guide assembly 300, a fan 400 and a diffusion air outflow assembly 500 which are sequentially arranged in the first receiving cavity 101 from back to front. The filter assembly 200 is able to purify air entering the first receiving cavity 101 via the air inlets 102 and flowing through the first receiving cavity 101, the air inflow guide assembly 300 defines a guide channel between the filter assembly 200 and the fan 400, the fan 400 generates an air flow that flows into the first receiving cavity 101 via the air inlets 102 and sequentially flows through the filter assembly 200, the guide channel, the fan 400 and the diffusion air outflow assembly 500, and the diffusion air outflow assembly 500 is able to rotate to guide the air flow to the air outlets 103, enables the air flow to diffuse outwards, and decreases the flow velocity of the air flow.

Figure 5:
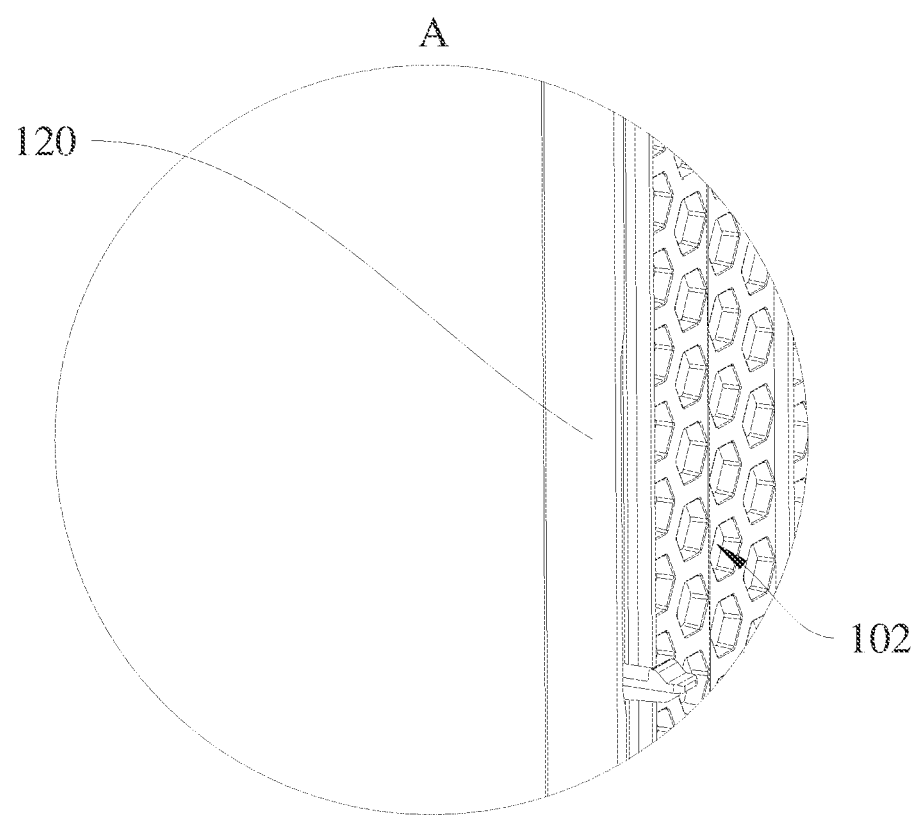
FIG. 5 is an enlarged view of part A in FIG. 4.

It should be noted that the number of the air inlets 102 and the number of the air outlets 103 are more than one, outside air enters the first receiving cavity 101 via the air inlets 102, and purified air is released to the external environment via the air outlets 103. Referring to FIG. 5 together, the size of the air inlets 102 and the size of the air outlets 103 should be smaller than that of the fingers of children to prevent the fingers of users from being clamped or stretched into the air inlets 102 and the air outlets 103, so that the safety performance of the air purifier is guaranteed and improved. In addition, the number of the air inlets 102 and the number of the air outlets 103 should be as large as possible to effectively increase the quantity of air entering or coming out of the first receiving cavity 101 per unit time under the condition where the safety performance is guaranteed, so that the purification efficiency of the air purifier is guaranteed and improved.

It should also be noted that the fan 400 comprises a driver 410 and multiple fan blades 420 which are connected to the driver 410 and are arranged in a circular array; when the fan 400 operates, the driver 410 can drive the fan blades 420 to synchronously rotate in the same direction to suck outside air into the first receiving cavity 101 via the air inlets 102, enables the air to flow front back to front to form an air flow flowing from back to front, and promotes the air flow to sequentially pass through the filter assembly 200, the air inflow guide assembly 300, the fan 400 and the diffusion air outflow assembly 500, and finally, purified air is released into the external environment via the air outlets 103. On this bases, as shown in FIG. 3, air flows into the air purifier from the back side and flows out of the air purifier from the front side, and the air out of the front side has to flow around at least the left side, the right side or the top side of the air purifier to reach the back side to be sucked into the air purifier again via the air outlets 102, so that the purification range of the air purifier is wide, and the indoor purification effect of the air purifier is good. In addition, the fan blades 420 of the fan 400 can shunt air flowing through the blades 420 to primarily change the flow direction of the air flow.

It should also be noted that when the air flow passes through the filter assembly 200, the filter assembly 200 can filter air to realize a purification effect. Illustratively, the filter assembly 200 may comprise a filter screen and activated carbon. Impurities such as dust and microorganisms in the air can be removed by the filter screen, and impurities such as formaldehyde in the air can be removed by the activated carbon, so that air purification is realized. Or, the filter assembly 200 may comprise a filter screen and a sponge sprayed with silver ions. Impurities such as dust and microorganisms in the air are removed by the filter screen, and the air is sterilized by the sponge, so that air purification is realized. These are only examples of the filter assembly 200 and should not be construed as limitations of this embodiment.

When the air flow purified by the filter assembly 200 passes through the air inflow guide assembly 300, the guide channel defined by the air inflow guide assembly 300 collects and guides the filtered air to the fan 400 to ensure that all the air can be shunted by the fan 400 to flow towards the diffusion air outflow assembly 500.

The diffusion air outflow assembly 500 connected to the driver 410 of the fan 400 can be driven by the driver 410 to rotate; when the high-speed purified air flow shunted by the fan 400 passes through the diffusion air outflow assembly 500, the diffusion air outflow assembly 500 can convert kinetic energy of the air into pressure energy to gradually decrease the flow velocity of the air flow and gradually increase the pressure of the air flow, the air will be pushed out via the air outlets 103 under pressure, and the flow velocity of the air flow discharged via the air outlets 103 is kept small to make users feel more comfortable. Before the air reaches the air outlets 103, the diffusion air outflow assembly 500 can gradually guide the air flow to extend outwards to expand the radiation range of the purified air discharged via the air outlets 103, so that the purification effect of the air purifier is optimized.

To sum up, when the air purifier provided by this embodiment of the application works, outside air enters the first receiving cavity 101 via the air inlets 102 in the back side of the first receiving cavity 101 under the effect of the fan 400 and is purified by the filter assembly 200; after that, the purified air is collected and guided by the air inflow guide assembly 300 to flow to the fan 400 and is shunted by the fan 400 to flow to the diffusion air outflow assembly 500, and then, the diffusion air outflow assembly 500 changes the flow direction, flow velocity and pressure of the air flow by means of rotary diffusion, so that the comfortable purified air can extend outwards to be discharged via the air outlets 103 in the front side of the first receiving cavity 101. Therefore, the air purifier provided by this embodiment of the application allows air to flow in from the back side and allows purified air to flow out from the front side, in this way, air discharged from the front side has to pass around at least the entire air purifier to be sucked into the air purifier again via the air inlets 102, so that the purification range of the air purifier is expanded to some extent, and the purification effect of the air purifier is guaranteed and improved; in addition, the diffusion air outflow assembly 500 of the air purifier enables purified air to diffuse outwards to decrease the flow velocity of the purified air, so that the radiation range of the purified air discharged by the air purifier is further expanded, and the purification effect of the air purifier is further improved.

Figure 4:
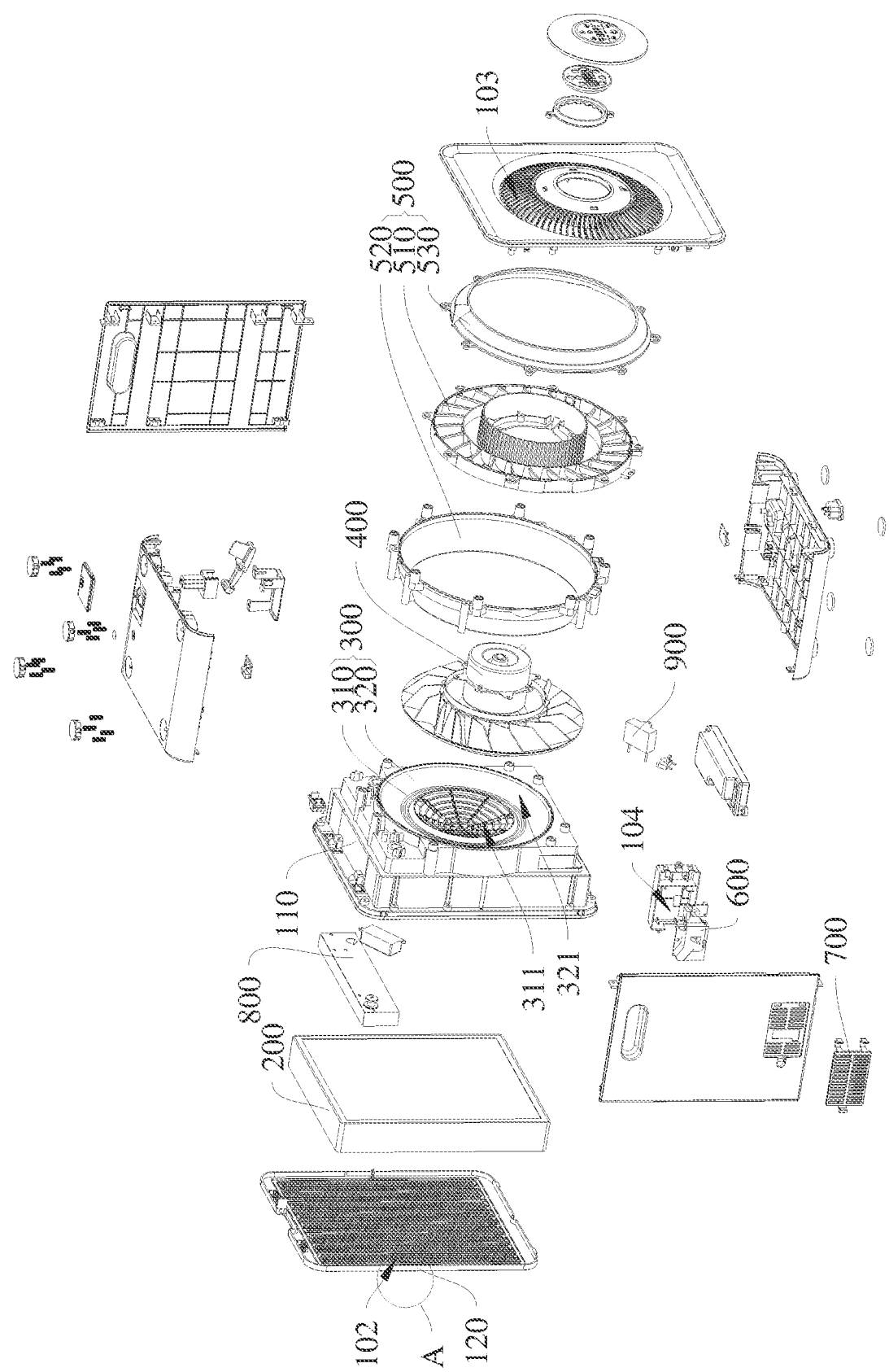
FIG. 4 is an exploded view of the air purifier in FIG. 1.
Figure 7:
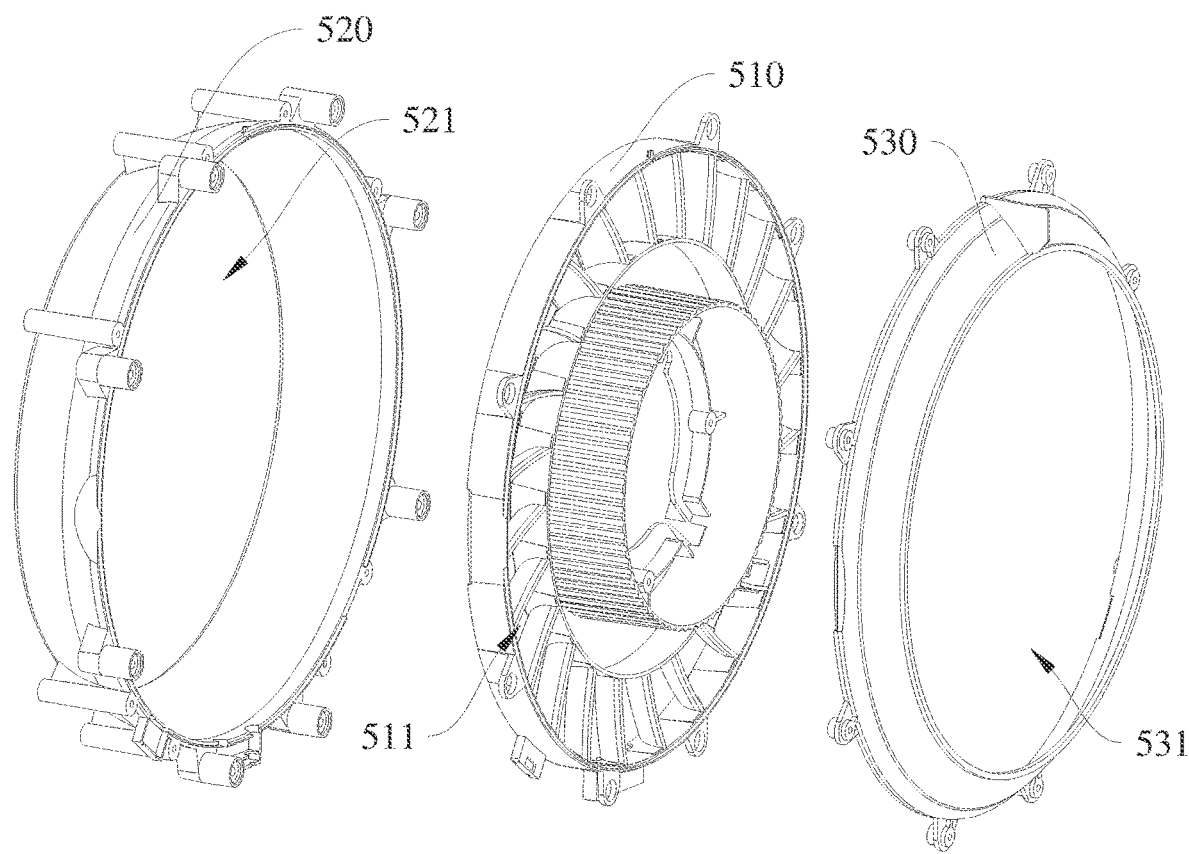
FIG. 7 is a structural view of a diffusion air outflow assembly in FIG. 4.
Figure 8:
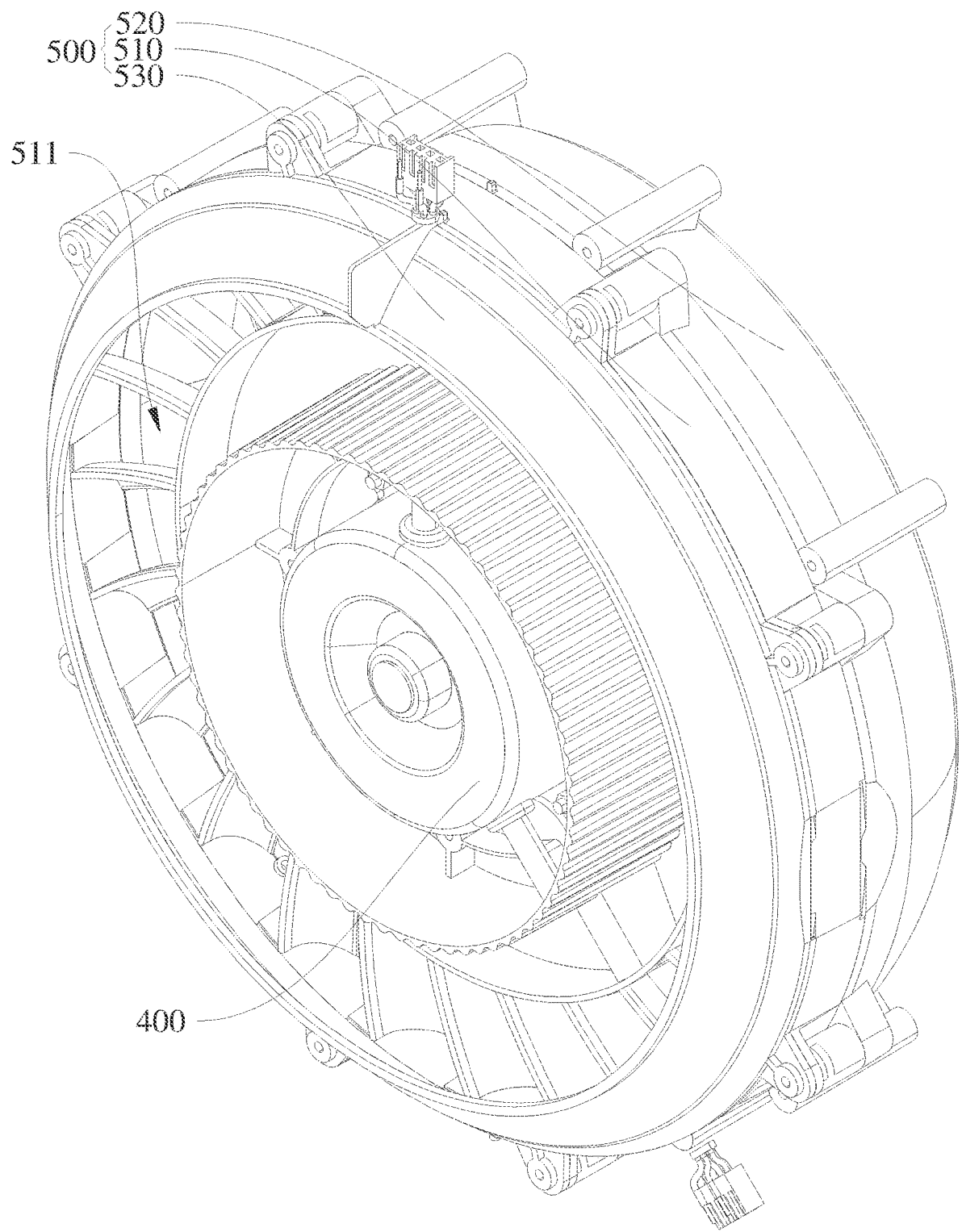
FIG. 8 is a structural view of the fan and the diffusion air outflow assembly provided by the embodiment of the application.

Referring to FIG. 4, FIG. 7 and FIG. 8, in this embodiment, the diffusion air outflow assembly 500 comprises a diffusion component 510 connected to the fan 400 and an extension component 520 connected to a back side of the diffusion component 510, and multiple diffusion ports 511 which penetrate through the diffusion component 510 and are distributed in a circular array are formed in the back side of the diffusion component 510, have a sectional dimension becoming larger gradually from back to front, and can change the flow direction of the air flow, decrease the flow velocity of the air flow and increase the pressure of the air flow; extension ports 521 which penetrate through the extension part 520 and are connected to the diffusion ports 511 are formed in a back side of the extension component 520, have a sectional dimension becoming larger gradually from back to front, and can guide the air flow to extend outwards to flow to the diffusion ports 511.

It should be noted that the diffusion component 510 can be driven by the fan 400 to drive the extension component 520 to rotate synchronously along with the fan 400. When the fan 400 shunts the air flow to the diffusion air outflow assembly 500, the extension component 520 covering the fan 400 and disposed on the front side of the fan 400 contacts with the air flow first, and the air flow can gradually extend outwards along the inner surfaces of the extension ports 521 with the sectional dimension becoming larger gradually. Front sides of the extension ports 521 are connected to the diffusion component 510, and the purified air enters the diffusion ports 511 after being extended by the extension ports 521; when the purified air flows forward along the diffusion ports 511, the flow velocity of the purified air will increase gradually from front to back with the gradual increase of the sectional dimension of the diffusion ports 511, and the flow velocity of the purified air in front decreases to allow the purified air to continuously surge forwards from the back to increase the pressure of the air, so that kinetic energy of the air is converted into pressure energy; the purified air is continuously pushed to the air outlets 103 under pressure, and finally, the flow velocity of the air flow discharged out of the diffusion ports 511 is decreased, and the pressure of the air flow is increased. In this way, the smoothness of purified air discharged via the air outlets 103 is guaranteed and improved, the usability of the air purifier is guaranteed and improved, and the radiation range of the purifier air discharged via the air outlets 103 is wide, so that the purification range of the air purifier is expanded, and the purification effect of the air purifier is further improved.

Referring to FIG. 4, FIG. 7 and FIG. 8, in this embodiment, the diffusion air outflow assembly 500 further comprises a guide component 530 connected to a front side of the diffusion component 510, a guide port 531 penetrating through the guide component 530 is formed in a front side of the guide component 530, a front side of the guide port 531 is connected to the air outlets 103, and a back side of the guide port 531 is connected to the front sides of the diffusion ports 511. By adoption of this solution, the purified air with the pressure increased and the flow velocity decreased by the diffusion ports 511 can be guided by the guide component 530 to be completely and accurately discharged via the air outlets 103, transition and delivery of the purified air are facilitated, the situation where the purified air leaks from the periphery of the diffusion air outflow assembly 500 and is accumulated in the first receiving cavity 101 can be effectively avoided, and thus, the usability of the air purifier is effectively guaranteed.

Figure 6:
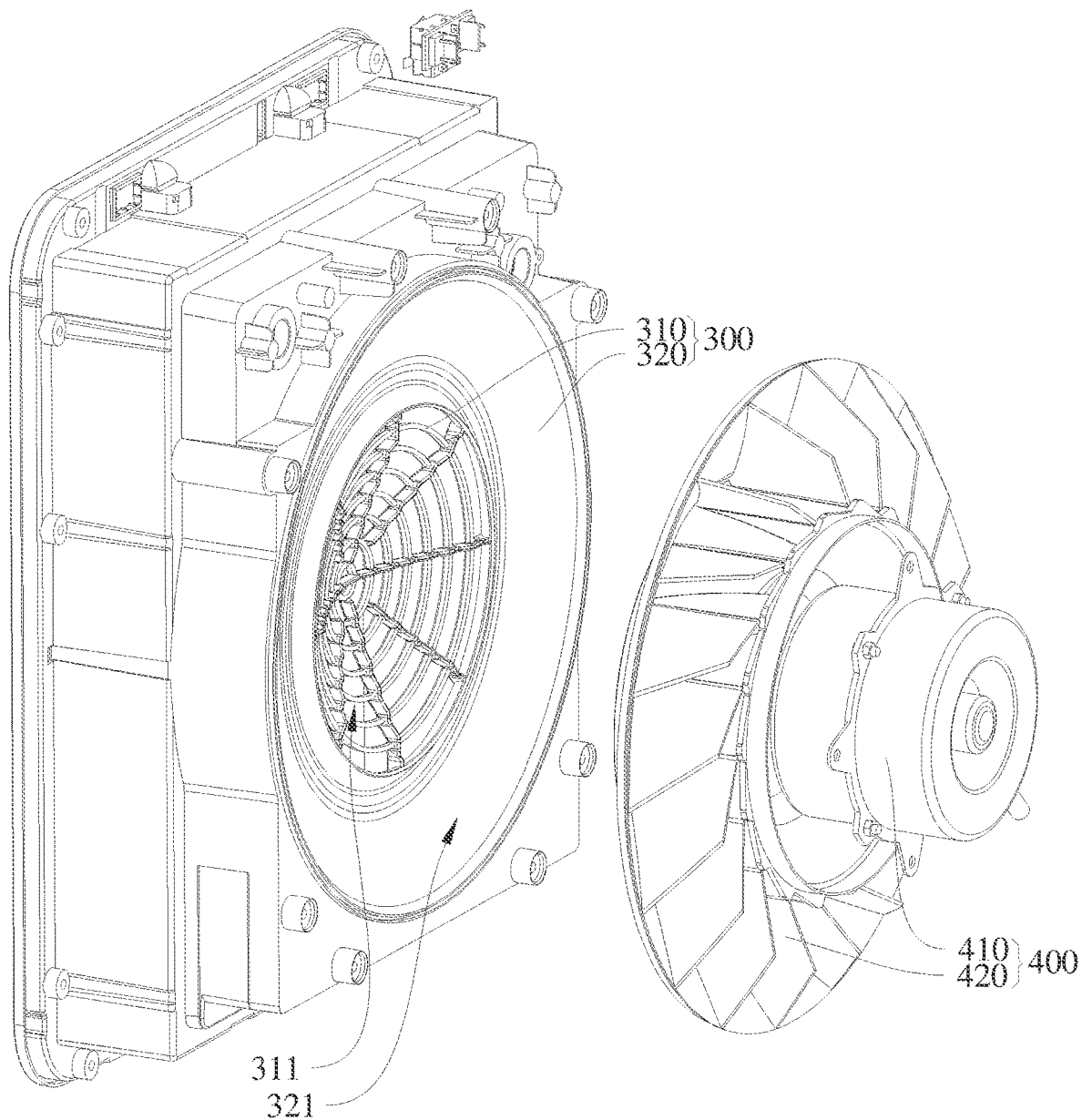
FIG. 6 is a structural view of an air inflow guide assembly and a fan in FIG. 4.

Referring to FIG. 3, FIG. 4 and FIG. 6, in this embodiment, the air inflow guide assembly 300 comprises an air collection structure 310 and a guide structure 320 connected to a front side of the air collection structure 310. An air collection port 311 leading to the filter assembly 200 is formed in a front side of the air collection structure 310 and has a sectional dimension becoming smaller gradually from front to back, a guide port 321 communicated with the air collection port 311 is formed in a front side of the guide structure 320 and has a sectional dimension becoming larger gradually from back to front, and the air collection port 311 and the guide port 321 form the guide channel. It should be noted that the sectional dimension of a side, close to the filter assembly 200, of the air collection port 311 is relatively small, so that the flow rate of air entering the air collection port 311 from the filter assembly 200 per unit time can be decreased correspondingly, that is, the flow velocity of the air flow from the filter assembly 200 to the air collection port 311 is decreased to ensure that the air is sufficiently filtered and purified by the filter assembly 200 before entering the air collection port 311, so that the purification effect of the air purifier is further guaranteed; the sectional dimension of the air collection port 311 becomes larger gradually from back to front, so that air transition and collection can be realized through the air collection port 311, and the air flow can be guided and delivered to the guide port 321. Afterwards, the air flow can be guided to the fan 400 through the guide port 321 with the sectional dimension becoming larger gradually from back to front. Thus, by adoption of this solution, the flow path of the air flow from the filter assembly 200 to the fan 400 can be effectively limited, the flow direction of the air flow is guided, and the flow velocity of the air flow can be primarily adjusted, and the usability of the air purifier can be guaranteed and improved.

Referring to FIG. 3, FIG. 4 and FIG. 6, in this embodiment, the maximum sectional dimension of the guide port 321 corresponds to the dimension of the fan 400. By adoption of this solution, it is effectively ensured that air guided by the guide port 321 can be completely shunted to the diffusion air outflow assembly 500 by the fan 400, and the situation where the air leaks around from the space between the guide port 321 and the fan 400 and is accumulated in the first receiving cavity 101 can be effectively avoided, so the usability of the air purifier is further guaranteed and improved, and the purification effect of the air purifier is guaranteed and improved.

Referring to FIG. 4, in this embodiment, the air purifier further comprises an air detection assembly 600 connected to the shell assembly 100 and used for detecting the quality of air. By adoption of this solution, the quality of air in an indoor space can be detected in real time through the air detection assembly 600, so that users can obtain corresponding information, and a control system of the air purifier can perform a corresponding instruction according to corresponding data.

Referring to FIG. 4, in this embodiment, the air detection assembly 600 comprises a dust sensor, a VOC sensor, a temperature sensor, a humidity sensor, a formaldehyde sensor, a carbon monoxide sensor, a carbon dioxide sensor and/or an ozone sensor. Herein, it should be noted that one or more of these sensors can be adopted to serve as the air detection assembly 600 of the air purifier to fulfill the corresponding air quality detection function of the air purifier. Here, the dust sensor can detect the content of dust in air, generally PM2.5 repairable particles. The VOC (volatile organic compounds) sensor can detect VOC in the air to avoid harm to human health caused when the VOC in the air reaches a certain concentration, and has a good warning effect. Similarly, the formaldehyde sensor can detect the formaldehyde content in the indoor space and has a good warning effect. The temperature sensor can stably detect the current temperature in the indoor space, the humidity sensor can detect the current humidity in the indoor space, the carbon monoxide sensor can detect the carbon monoxide content in the indoor space, the carbon dioxide sensor can detect the carbon dioxide content in the indoor space, and the ozone sensor can detect the ozone content in the indoor space.

Referring to FIG. 1 and FIG. 4, in this embodiment, a detection accommodating cavity 104 for accommodating the air detection assembly 600 is formed in a left side and/or a right side of the shell assembly 100 and has an access port communicated with the outside. The air purifier further comprises an access door 700 connected to the shell assembly 100 and used for opening or closing the access port. By adoption of this technical solution, the air detection assembly 600 can be accommodated in the detection accommodating cavity 104, and the access port of the accommodating cavity 104 can be opened or closed through the access door 700. In this way, the air detection assembly 600 can contact with air in the indoor space to realize accurate detection; and at the end of the service life of the air detection assembly 600, users can open the access door 700 to maintain or change the air detection assembly 600 in the detection accommodating cavity 104 conveniently.

Referring to FIG. 3 and FIG. 4, in this embodiment, the air purifier further comprises an ultraviolet sterilization component 800 connected to the air inflow guide assembly 300 and used for sterilizing the fan 400. By adoption of this solution, the fan blades 420 of the fan 400 can be sterilized and disinfected by the ultraviolet sterilization component 800 (such as a UV sterilization lamp) connected to the air inflow guide assembly 300, microorganisms will not be accumulated on the fan 400 even if the fan 400 cannot be disassembled to be cleaned, and the situation where the air purified by the filter assembly 200 is stained with more microorganisms when passing through the fan 400 is avoided. Thus, by the adoption of this solution, the air purification effect of the air purifier can be further guaranteed and improved.

Referring to FIG. 4, in this embodiment, the air purifier further comprises an anion generator 900 and/or a plasma generator connected to the diffusion air outflow assembly 500. It should be noted that the anion generator 900 and/or the plasma generator is disposed close to the diffusion air outlet 500. Here, the anion generator 900 and the plasma generator can ionize air at a high voltage and generate a large quantity of anions which can neutralize smoke dust with positive charges floating in air to enable the smoke dust to deposit naturally, so that the effects of removing smokes and dust, eliminating odors and improving the air quality are realized. Thus, by adoption of this solution, the air purification effect of the air purifier can be further guaranteed and improved.

Referring to FIG. 1, FIG. 3 and FIG. 4, in this embodiment, the shell assembly 100 comprises a shell body 110 and a back cover 120 detachably connected to the shell body 110. The shell body 110 has a first accommodating cavity 111 which is open backwards and a second accommodating cavity 112 located in front of the first accommodating cavity 111, the first accommodating cavity 111 is used for accommodating the filter assembly 200, the second accommodating cavity 112 is used for accommodating the air inflow guide assembly 300, the fan 400 and the diffusion air outflow assembly 500, the second accommodating cavity 112 is communicated with the first accommodating cavity 111 through the air inflow guide assembly 300, and the first accommodating cavity 111 and the second accommodating cavity 112 form the first receiving cavity 101 jointly. By adoption of this solution, the first receiving cavity 101 is divided into the first accommodating cavity 111 for accommodating the filter assembly 200 and the second accommodating cavity 112 for accommodating the air inflow guide assembly 300, the fan 400 and the diffusion air outflow assembly 500, so that the air inflow guide assembly 300, the fan 400 and the diffusion air outflow assembly 500 can be protected by the closed second accommodating cavity 112, and the back cover can be assembled on or disassembled from the shell body 110 more conveniently, and users can disassemble the back cover from the shell body 110 to change the filter assembly 200 easily, conveniently and timely after the filter assembly 200 has been used for a period of time (the air purifier can monitor the service time of the filter assembly 200 and give a corresponding prompt when the filter assembly 200 needs to be changed), and thus, the air purification effect of the filter assembly 200 can be guaranteed and improved. Optionally, the back cover is detachably connected to the shell body 110 through, but not limited to, magnetic attraction, so the back cover can be assembled on or disassembled from the filter assembly 200 more conveniently.

Air purifiers with different capacities can be used according to different indoor spaces to meet purification requirements. On this basis, those skilled in the art put forward the solution of arranging multiple small-capacity air purifiers in a large space to satisfy the purification requirements of large spaces as well as the purification requirements of small spaces, and the solution of sequentially stacking the air purifiers to reduce the whole space occupies by the air purifiers. However, existing air purifiers are all independent ones and cannot be aligned or electrically connected stably and reliably when stacked together, so users have to operate and control these air purifiers separately, which makes the operation complicated and is not beneficial for overall control of the purification effect and efficiency of these air purifiers in the same indoor space.

Figure 15:
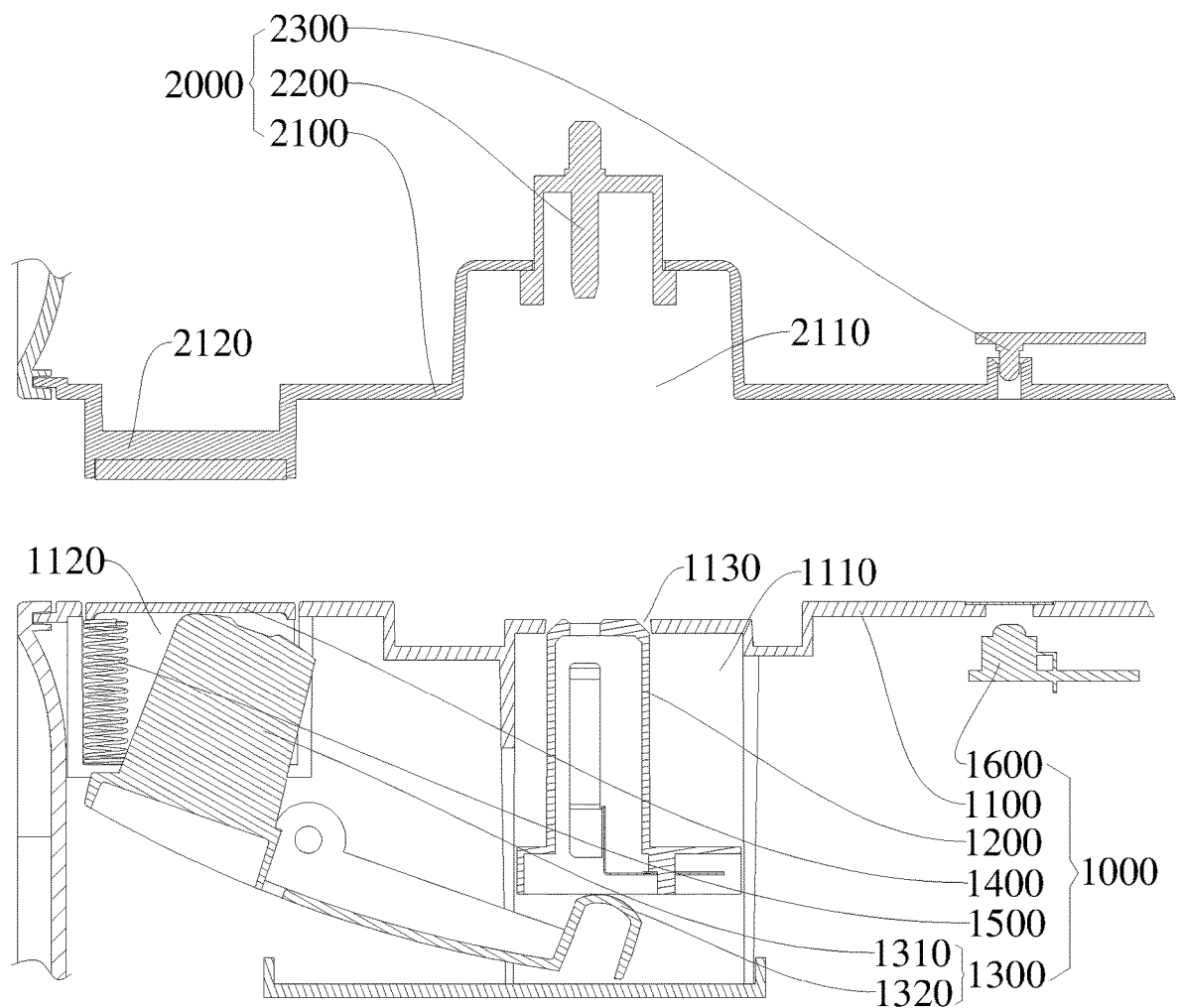
FIG. 15 is a schematic diagram of a male connecting assembly and a female connecting assembly which are aligned to each other in one embodiment of the application.
Figure 16:
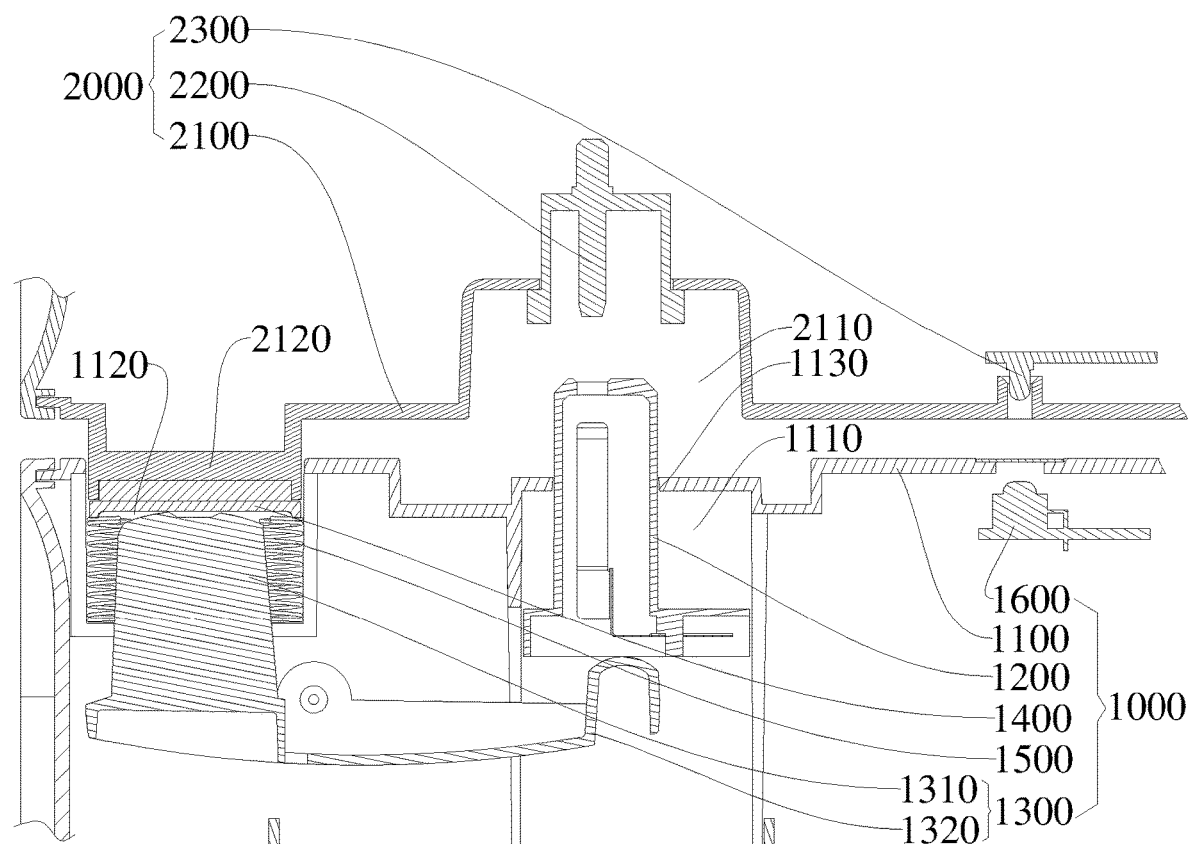
FIG. 16 is a schematic diagram of the connecting process of a male connecting assembly and a female connecting assembly provided by one embodiment of the application.
Figure 17:
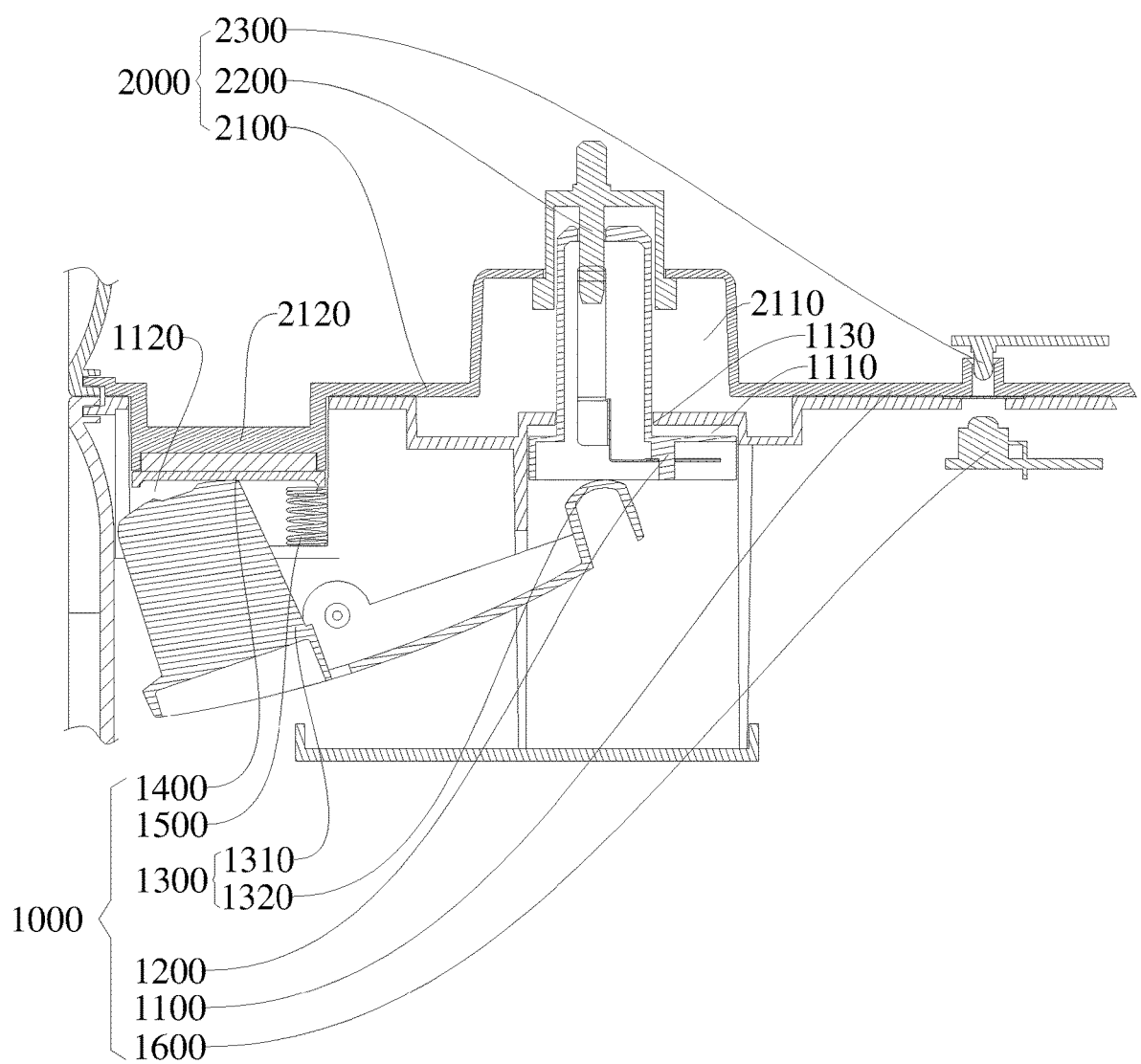
FIG. 17 is a schematic diagram of male connecting assembly and a female connecting assembly which are connected and matched with each other in one embodiment of the invention.

In view of this, as shown in FIG. 15, FIG. 16 and FIG. 17, an embodiment of the application provides a male connecting assembly 1000 which comprises a male base 1100, a male terminal 1200 and a link structure 1300.

Here, the male base 1100 is formed with a second receiving cavity 1110 and is also formed, in a connecting direction a, with a connecting hole 1120 and a male hole 1130 which are spaced apart from each other and penetrating through the second receiving cavity 1110 to the outside; the male terminal 1200 is made of a conducting material and is located in the second receiving cavity 1110; the link structure 1300 is located in the second receiving cavity 1110 and is provided with a first link part 1310 and a second link part 1320. The first link part 1310 is opposite to the connecting hole 1120 in the connecting direction a and is pressed, when an external connecting structure is disposed in the connecting hole 1120, by the connecting structure to move away from the connecting hole 1120 to reach a connecting position, and the second link part 1320 is linked with the first link part 1310 and drives, when the first link part 1310 moves to the connecting position, the male terminal 1200 to at least partially stretch out of the second receiving cavity 1110 via the male hole 1130.

The male connecting assembly 1000 provided by this embodiment of the application can be connected to the external connecting structure by means of the connecting hole 1120 to realize accurate alignment; when the connecting structure is not disposed in the connecting hole 1120, the male terminal 1200 can be accommodated in the second receiving cavity 1110 to be effectively protected against damage, such that the usability of the male terminal 1200 is guarantee and the service life of the male terminal 1200 is prolonged to some extent, thus guaranteeing and improving the reliability of electrical connection realized by the male connecting assembly 1000 to some extent; when the connecting structure is disposed in the connecting hole 1120, the connecting structure presses the first link part 1310 of the link structure 1300 to move the connecting position, and then the second link part 1320 drives the male terminal 1200 to stretch out via the male hole 1130, so that a stable and reliable electrical connection relation can be established through the stretching-out male terminal 1200 based on accurate alignment of multiple work devices in the connecting direction. Thus, by adoption of this solution, the service life of a work device adopting the male connecting assembly 1000, such as an air purifier, can be guaranteed and prolonged, accurate alignment is realized, and a stable and reliable electrical connection relation can be established in the connecting direction.

Figure 9:
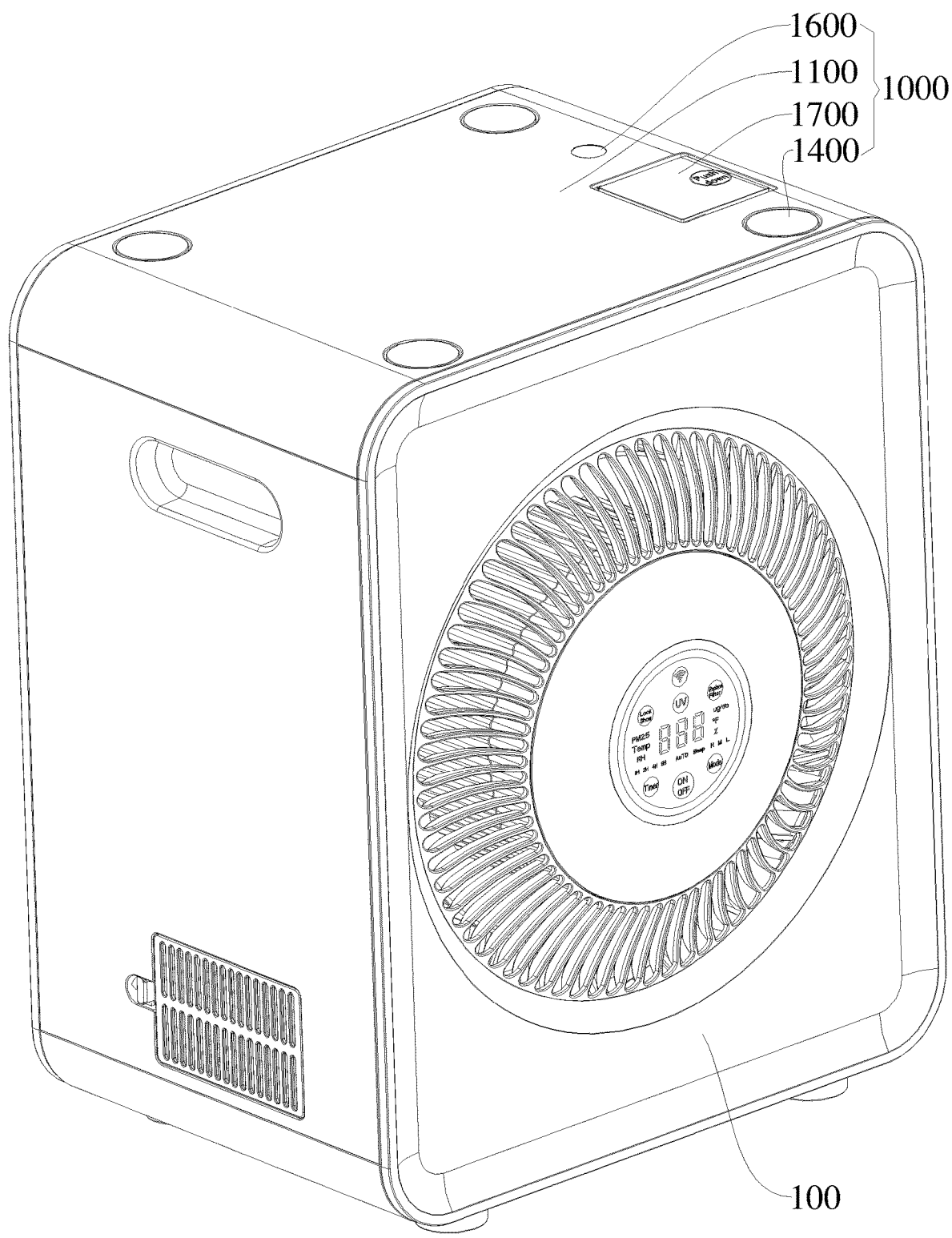
FIG. 9 is a structural view of a shell assembly and a male connecting assembly provided by one embodiment of the application.

It should be noted here that at least one connecting hole 1120 is formed in the male base 1100. Illustratively, as shown in FIG. 9, four connecting holes 1120 are formed in the male base 1100 and are arranged in a rectangular array, such that the connecting hole 1120 can be connected to connecting structures in a limited or unique manner to allow users to complete alignment rapidly and accurately, thus effectively lowering the alignment difficulty and making operation more convenient. When to be connected and matched with the external connecting structure, a work device formed with the connecting hole 1120 can be aligned to a work device provided with the connecting structure to establish a stable and accurate mechanical connection structure.

Is should also be noted here that the male hole 1130 is spaced apart from at least one connecting hole 1120 to enable the link structure 1300 to realize a link affect. The first link part 1310 of the link structure 1300 is opposite to at least one connecting hole 1120 in the connecting direction a. On the basis of the link structure 1300, the mechanical connection relation and the electrical connection relation can be associated.

Specifically, when the connecting structure is not disposed in the connecting hole 1120, that is, the mechanical connection relation is not established, the male terminal 1200 can be accommodated in the second receiving cavity 1110 to be protected by the second receiving cavity 1110, such that damage to the male terminal 1200 can be effectively reduced, and the electrical connection effect of the male connecting assembly 1000 will not be affected by the damage to the male terminal 1200, thus effectively prolonging the service life of the male terminal 1200, that is, prolonging the service life of the male connecting assembly 1000, and guaranteeing the stability and reliability of electrical connection realized by the male connecting assembly 1000.

When the connecting structure is disposed in the connecting hole 1120, that is, the mechanical connection relation is established, the first link part 1310 of the link structure 1300 will be pressed by the connecting structure to move to the connecting position, the second link part 1320 linked with the first link part 1310 will drive the male terminal 1200 to stretch out via the male hole 1130, such that a stable and reliable electrical connection relation can be established between corresponding work devices on the basis of accurate alignment, thus realizing associative operation and facilitating overall control.

To sum up, the male connecting assembly 1000 provided by this embodiment of the application can be connected to the external connecting structure by means of the connecting hole 1120 to realize accurate alignment; when the connecting structure is not disposed in the connecting hole 1120, the male terminal 1200 can be accommodated in the second receiving cavity 1110 to be effectively protected against damage, such that the usability of the male terminal 1200 is guarantee and the service life of the male terminal 1200 is prolonged to some extent, thus guaranteeing and improving the reliability of electrical connection realized by the male connecting assembly 1000 to some extent; when the connecting structure is disposed in the connecting hole 1120, the connecting structure presses the first link part 1310 of the link structure 1300 to move the connecting position, and then the second link part 1320 drives the male terminal 1200 to stretch out via the male hole 1130, so that a stable and reliable electrical connection relation can be established through the stretching-out male terminal 1200 based on accurate alignment of multiple work devices in the connecting direction a. Thus, by adoption of this solution, the service life of a work device adopting the male connecting assembly 1000, such as an air purifier, can be guaranteed and prolonged, accurate alignment is realized, and a stable and reliable electrical connection can be established in the connecting direction a.

Referring to FIG. 15, FIG. 16 and FIG. 17, in this embodiment, the first link part 1310 and the second link part 1320 are connected and are able to rotate synchronously around a link axis. The first link part 1310 and the second link part 1320 are arranged on two sides of the link axis respectively, and the first link part 1320 abuts against a side, away from the male hole 1130, of the male terminal 1200. It should be noted here that because the first link part 1310 and the second link part 1320 are arranged on the two sides of the link axis respectively, the moving direction of the first link part 1310 will be opposite to the moving direction of the second link part 1320 when the first link part 1310 and the second link part 1320 synchronously rotate around the link axis. In this way, when the connecting structure is disposed in the connecting hole 1120, that is, the mechanical connection relation is established, the first link part 1310 will be pressed by the connecting structure to move in the connecting direction a to the connecting position and drive the second link part 1320 to push the male terminal 1200 in the connecting direction a, such that the male terminal 1200 can be driven to stretch out via the male hole 1130. Thus, based on the configuration of this embodiment, the male terminal 1200 can be reliably and effectively associated with the connecting hole 1120 and can protrude out of the male hole 1130 when the mechanical connection relation is established, such that the male connecting assembly 1000 can establish a stable and reliable electrical connection relation by means of the male terminal 1200, thus further improving the usability of the male connecting assembly 1000 and further guaranteeing and improving the stability and reliability of the mechanical connection relation and the electrical connection relation established based on the male connecting assembly 1000.

Figure 11:
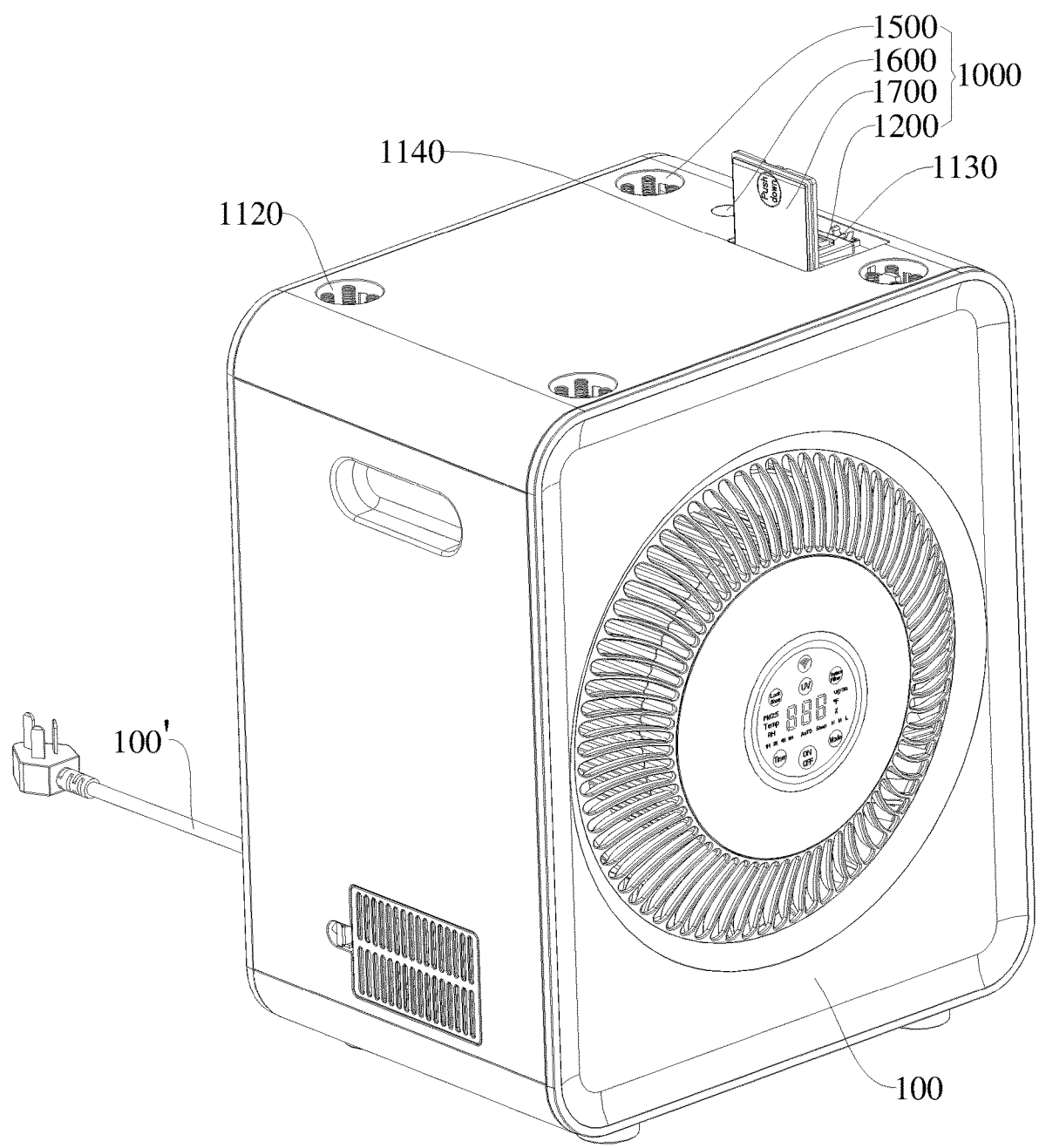
FIG. 11 is a first partial structural view of a shell assembly, an external electrical connector and a male connecting assembly provided by one embodiment of the application.

Referring to FIG. 9, FIG. 11 and FIG. 17, in this embodiment, the male connecting assembly 1000 further comprises at least one connecting cover 1400 capable of sliding in the connecting hole 1120 in the connecting direction a and at least one elastic part 1500 elastically connected between the connecting cover 1400 and the bottom of the connecting hole 1120. It should be noted here that when the connecting structure is not disposed in the connecting hole 1120, the elastic part 1500 can elastically abut against the connecting cover 1400 and the bottom of the connecting hole 1120, such that the connecting cover 1400 can cover the connecting hole 1120 to protect the connecting hole 1120 and the second receiving cavity 1110 against dust and water, thus further guaranteeing the usability of the male connecting assembly 1000 and prolonging the service life of the male connecting assembly 1000. When the connecting structure is disposed in the connecting hole 1120, the connecting cover 1400 can move in the connecting direction a to allow the connecting hole 1120 to be connected to the connecting structure and can be pressed by the connecting structure to enable the first link part 1310 to move to the connecting position, at the same time, the elastic part 1500 will be compressed to deform elastically with the decrease of the distance between the connecting cover 1400 and the bottom of the connecting hole 1120, and on this basis, when the connecting structure is disengaged from the connecting hole 1120, the elastic part 1500 can deform elastically to enable the connecting cover 1400 to restore. Thus, by adoption of this solution, the usability of the male connecting assembly 1000 can be further guaranteed and improved, and the stability and reliability of the mechanical connection relation and the electrical connection relation established based on the male connecting assembly 1000 are further guaranteed and improved.

Referring to FIG. 9 and FIG. 17, in this embodiment, the male connecting assembly 1000 further comprises a male sensor 1600 for realizing signal connection. The male sensor 1600 is a signal transmitter or a signal receiver. It should be noted here that under the precondition where a stable and accurate mechanical connection relation has been established, that is, accurate alignment has been realized, the male connecting assembly 1000 can establish stable and reliable signal connection with an external signal sensor by means of the male sensor 1600. Here, if the male sensor 1600 is the signal transmitter, the external signal sensor should be the signal receiver; on the contrary, if the male sensor 1600 is the signal receiver, the external signal sensor should be the signal transmitter. On this basis, users can further operate and control all work devices for realizing mechanical connection, electrical connection and signal connection as a whole and can accurately coordinate and control the work efficiency and effect of the work devices, operation is easy, and the usability is good.

Figure 12:
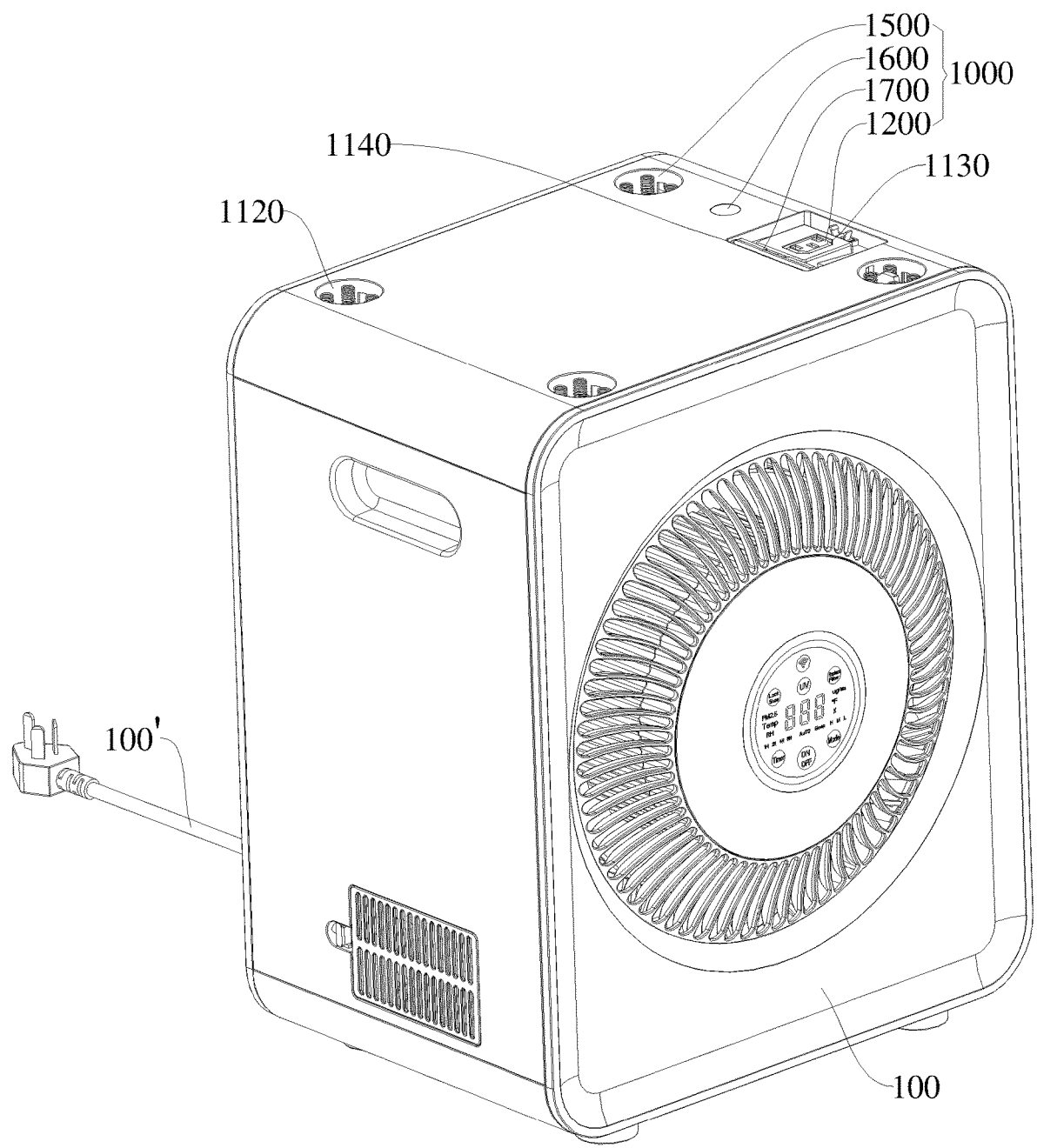
FIG. 12 is a second partial structural view of the shell assembly, the external electrical connector and the male connecting assembly provided by one embodiment of the application.

Referring to FIG. 11 and FIG. 12, in this embodiment, the male base 1100 is further formed with an accommodating groove 1140 beside the male hole 1130, and the male connecting assembly 1000 further comprises a dust cover 1700 which is in a closed state or an open state; in the closed state, the dust cover 1700 covers the male hole 1130 and the accommodating groove 1140; and in the open state, the dust cover 1700 opens the male hole 1130 and is accommodated in the accommodating groove 1140. It should be noted here that when no electrical connection relation needs to be established by the male connecting assembly 1000, the dust cover 1700 is closed, at this moment, the dust cover 1700 covers the male hole 1130 and the accommodating groove 1140, so that the male terminal 1200 accommodated in the second receiving cavity 1110 is further protected, and the male hole 1130 and the male terminal 1200 are protected against dust and water, thus further effectively reducing damage to the male terminal 1200, preventing the electrical connection effect of the male connecting assembly 1000 from being affected by the damage to the male terminal 1200, further prolonging the service life of the male terminal 1200, that is, prolonging the service life of the male connecting assembly 1000, and further guaranteeing and improving the stability and reliability of electrical connection realized by the male connecting assembly 1000. When a mechanical connection relation and an electrical connection relation need to be established by the male connecting assembly 1000, the dust cover 1700 will be adjusted to the open state to open the male hole 1130 and be accommodated in the accommodating groove 1140 to prevent any interference on the male terminal 1200, so it is guaranteed that a stable, reliable and electrical connection relation can be established by the male terminal 1200.

Figure 10:
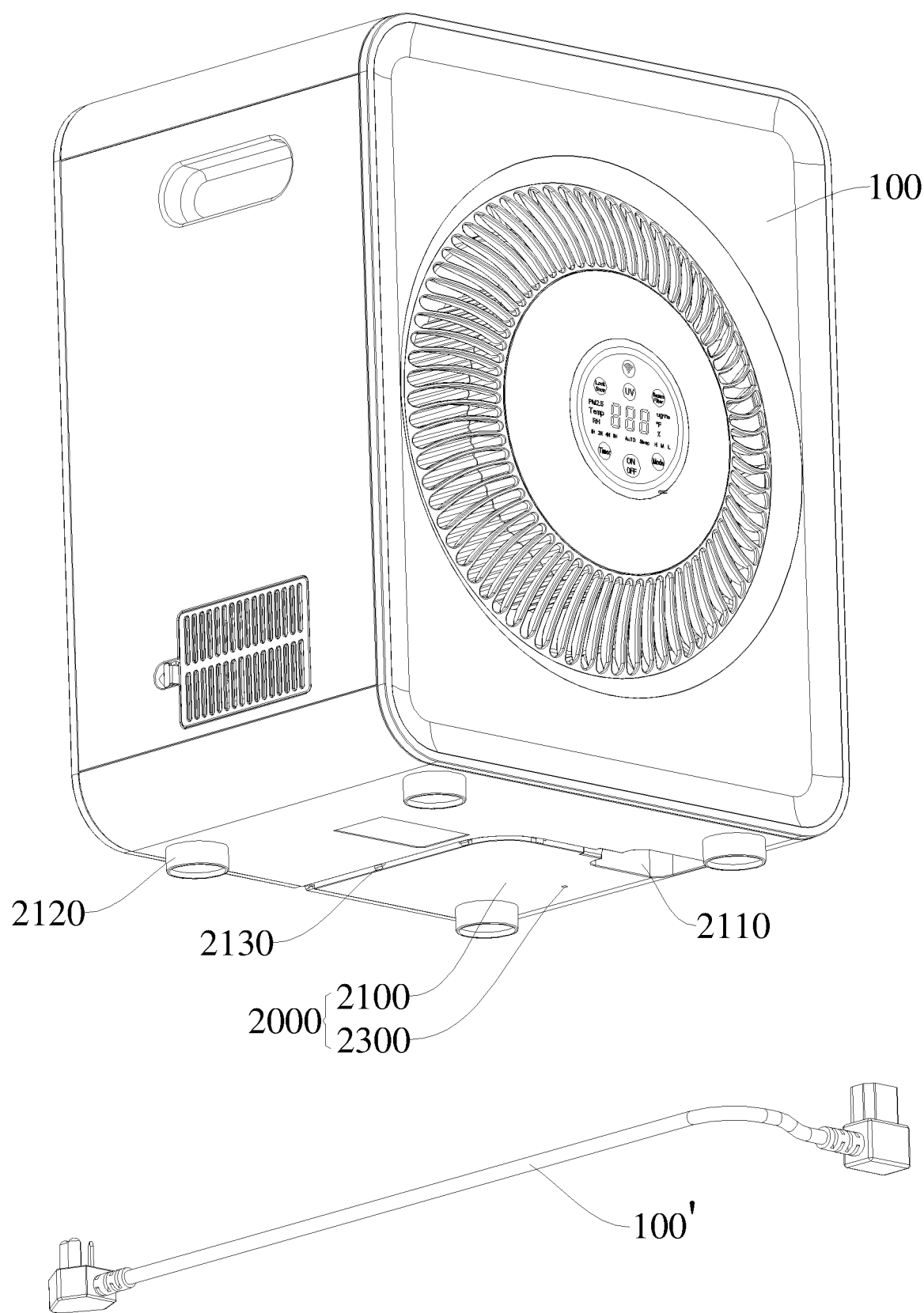
FIG. 10 is a structural view of a shell assembly, an external electrical connector and a female connecting assembly provided by one embodiment of the application.

Referring to FIG. 10, FIG. 15 and FIG. 17, the objective of the embodiments of the application is to further provide a female connecting assembly 2000 which is to be connected and matched with the male connecting assembly 1000 and comprises a female base 2100 and a female terminal 2200.

Here, the female base 2100 is formed with a female hole 2110 opposite to the male hole 1130 in the connecting direction a and is provided with a connecting protrusion 2120 opposite to the connecting hole 1120 in the connecting direction a, the connecting protrusion 2120 is inserted into the connecting hole 1120 and is used to press the first link part 1310 to the connecting position, and the female terminal 2200 is made of a conducting material, located in the female hole 2110 and electrically connected to the male terminal 1200.

It should be noted here that the number of the connecting protrusions 2120 is equal to that of the connecting holes 1120, and the shape and size of the connecting protrusions 2120 correspond to the shape and size of the connecting holes 1120. The connecting protrusions 2120 are inserted into and matched with the connecting holes 1120 in one-to-one correspondence, so the female connecting assembly 2000 and the male connecting assembly 1000 can be accurately aligned, and a stable and reliable mechanical connection relation can be established. Based on the alignment of the connecting protrusion 2120 and the connecting hole 1120, the female hole 2110 will be aligned to the male hole 1130, and the female terminal 2200 will be aligned to the male terminal 1200. When inserted into and matched with the connecting hole 1120, the connecting protrusion 2120 can press the first link part 1310 to move to the connecting position, and then the second link part 1320 drives the male terminal 1200 to stretch out via the male hole 1130 to be inserted into and matched with the female terminal 2200, thus establishing a stable and reliable electrical connection relation.

Thus, the female connecting assembly 2000 provided by this embodiment can establish a stable, reliable and accurate mechanical and electrical connection relation with the male connecting assembly 1000, that is, a stable and reliable mechanical and electrical connection relation can be established between a work device provided with the female connecting assembly 2000 and a work device provided with the male connecting assembly 1000, so users can control the work devices collaboratively and can operate the work devices in a unified manner, operation is easy, the work devices can synchronously and simultaneously complete corresponding work, and the collaborative work efficiency and effect of the work devices can be guaranteed and improved to some extent.

Referring to FIG. 10, in this embodiment, the female terminal 2200 can be electrically connected to an external electrical connector 100', the female base 2100 is further formed with a wiring trough 2130 for guiding the external electrical connector 100', and the wiring trough 2130 is communicated with the female hole 2110. It should be noted here that because the work devices can also perform corresponding work independently and the last one of all the work devices sequentially connected in the connecting direction a should also be electrically connected to a power supply, the female terminal 2200 is arranged to be inserted into and matched with the external electrical connector 100' to realize electrical connection. On this basis, in this embodiment, the wiring trough 2130 is arranged to guide an electrical cable of the external electrical connector 100' to optimize the layout, thus further guaranteeing and improving the stability and reliability of the electrical connection relation established by the female connecting assembly 2000.

It should also be noted here that the female terminal 2200 and the male terminal 1200 are relative concepts; and when the male terminal 1200 needs to be electrically connected and matched with the external electrical connector 100', the male base 1100 can be configured with reference to the above embodiments, and details will no longer be given herein.

Referring to FIG. 10, FIG. 15 and FIG. 17, the objective of the embodiment of the application is to further provide a female connecting assembly 2000 which is to be connected and matched with the male connecting assembly 1000 and comprises a female base 2100, a female terminal 2200 and a female sensor 2300.

Here, the female base 2100 is formed with a female hole 2110 opposite to the male hole 1130 in the connecting direction a and is provided with a connecting protrusion 2120 opposite to the connecting hole 1120 in the connecting direction a. The connecting protrusion 2120 is inserted into the connecting hole 1120 and is used to press the first link part 1310 to the connecting position; the female terminal 2200 is made of a conducting material, located in the female hole 2110 and electrically connected to the male terminal 1200; the female sensor 2300 is aligned to the male sensor 1600 in the connecting direction a and is in signal connection with the male sensor 1600; when the male sensor 1600 is a signal transmitter, the female sensor 2300 is a signal receiver; and when the male sensor 1600 is a signal receiver, the female sensor 2300 is a signal transmitter.

It should be noted here that in case where the male connecting assembly 1000 comprises the male base 1100, the male terminal 1200 and the male sensor 1600, the female connecting assembly 2000 comprises the female base 2100, the female terminal 2200 and the female sensor 2300, correspondingly.

Here, the number of the connecting protrusions 2120 is equal to that of the connecting holes 1120, and the shape and size of the connecting protrusions 2120 correspond to the shape and size of the connecting holes 1120. The connecting protrusions 2120 are inserted into and matched with the connecting holes 1120 in one-to-one correspondence, such that the female connecting assembly 2000 and the male connecting assembly 1000 can be accurately aligned, and a stable and reliable mechanical connection relation can be established. Based on the alignment of the connecting protrusion 2120 and the connecting hole 1120, the female hole 2110 will be aligned to the male hole 1130, the female terminal 2200 will be aligned to the male terminal 1200, the female sensor 2300 will be aligned to the male terminal 1600, one of the female sensor 2300 and the male sensor 1600 can transmit signals, and the other one can receive signals, such as a stable and reliable signal connection relation is established. When the connecting protrusion 2120 is inserted into and matched with the connecting hole 1120, the connecting protrusion 2120 can press the first link part 1310 to move to the connecting position, and then the second link part 1320 drives the male terminal 1200 to stretch out via the male hole 1130 to be inserted into and matched with the female terminal 2200, so that a stable and reliable electrical connection relation is established.

Thus, the female connecting assembly 2000 provided by this embodiment can establish a stable, reliable and accurate mechanical and electrical connection relation with the male connecting assembly 1000, that is, a stable and reliable mechanical and electrical connection relation can be established between a work device provided with the female connecting assembly 2000 and a work device provided with the male connecting assembly 1000, so users can control the work devices collaboratively and can operate the work devices in a unified manner, operation is easy, the work devices can synchronously and simultaneously complete corresponding work, and the collaborative work efficiency and effect of the work devices can be guaranteed and improved to some extent.

Referring to FIG. 15, FIG. 16 and FIG. 17, in this embodiment, the female sensor 2300 is an infrared sensor. Correspondingly, the male sensor 1600 is also an infrared sensor. One of the female sensor 2300 and the male sensor 1600 is an infrared transmitter, and the other one of the female sensor 2300 and the male sensor 1600 is an infrared receiver. By adoption of this solution, the stability and reliability of signal connection between work devices can be further guaranteed and improved.

Figure 13:
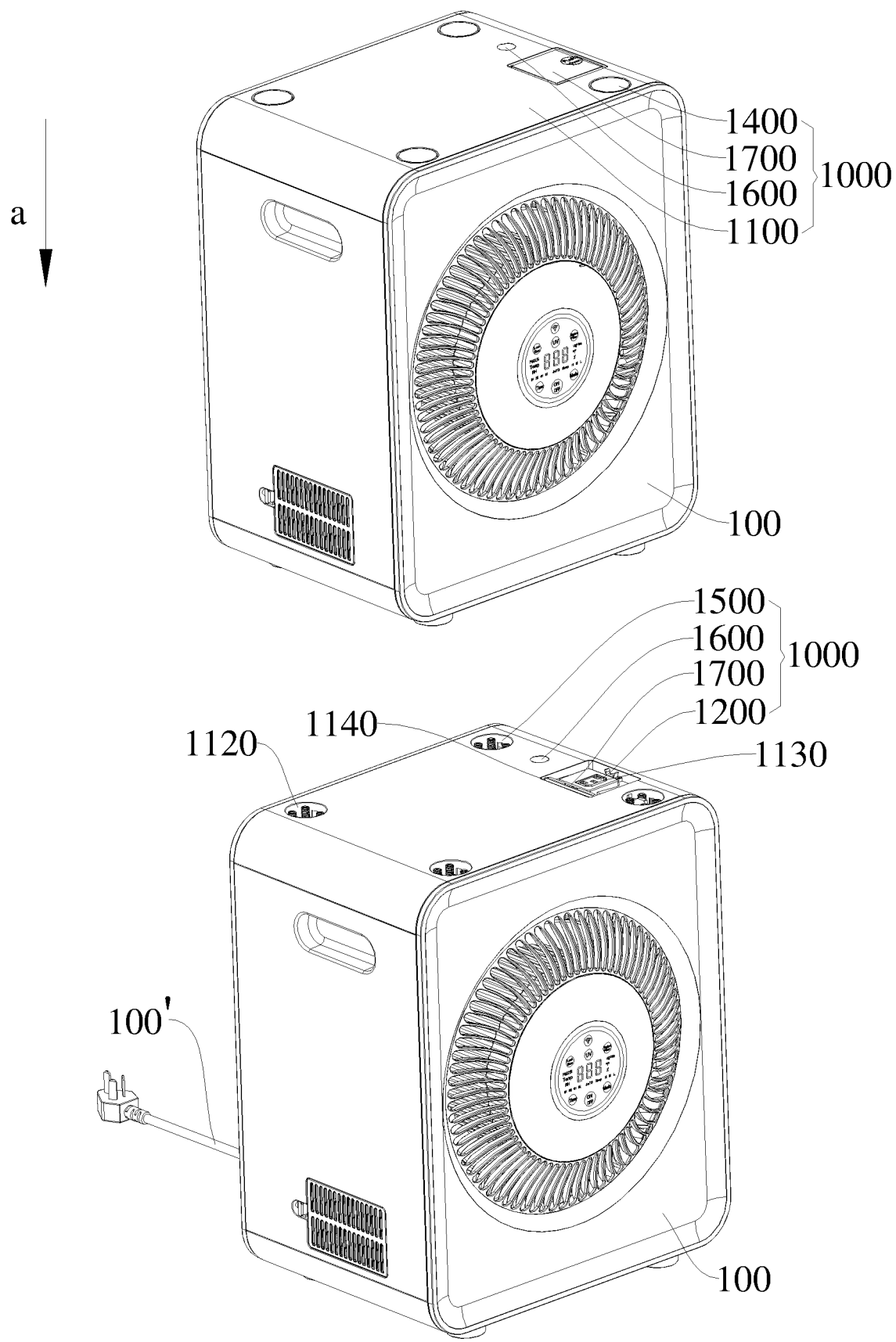
FIG. 13 is a schematic diagram of two air purifiers connected in a connecting direction in one embodiment of the application.
Figure 14:
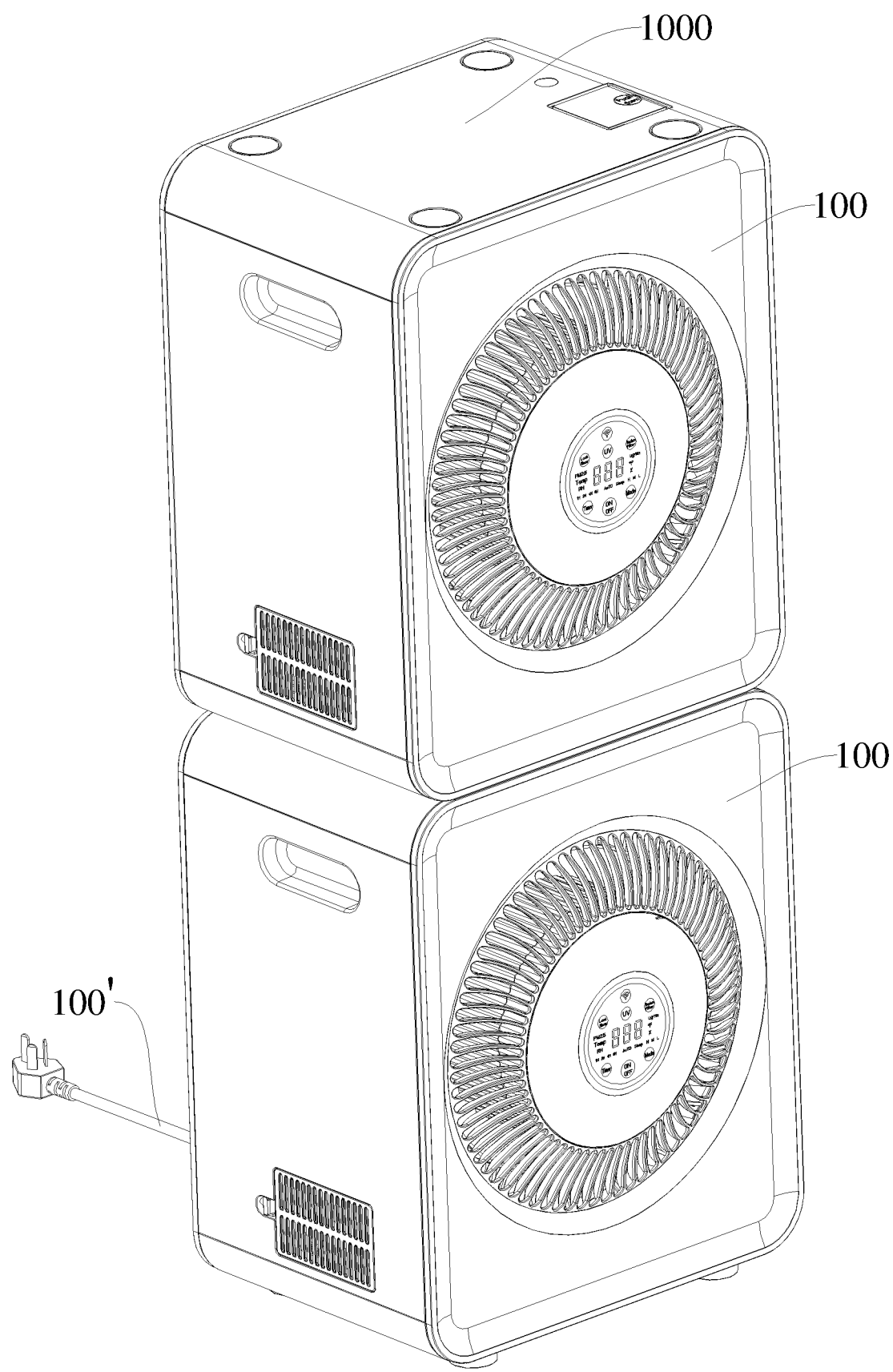
FIG. 14 is a schematic diagram of two air purifiers accurately aligned in one embodiment of the application.

Referring to FIG. 13, FIG. 14 and FIG. 17, the objective of the embodiment of the application is to further provide an air purifier which comprises a shell assembly 100, the male connecting assembly 1000 and/or the female connecting assembly 2000. It should be noted here that an air purifier provided with the male connecting assembly 1000 and an air purifier provided with the female connecting assembly 2000 can be accurately aligned in the connecting direction a and can establish a stable and reliable mechanical, electrical and signal connection relation therebetween, so that users can control the air purifiers collaboratively and operate the air purifiers in a unified manner, operation is easy, the air purifiers can synchronously and simultaneously perform corresponding work, and the collaborative purification efficiency and effect of the air purifiers in the same indoor space can be guaranteed and improved to some extent.

Preferably, an air purifier is provided with both the male connecting assembly 1000 and the female connecting assembly 2000. The male connecting assembly 1000 and the female connecting assembly 2000 are arranged on two sides of the shell assembly 100 respectively in the connecting direction 1, so multiple air purifiers can be sequentially connected in the connecting direction. In this way, each work purifier can work independently to satisfy the purification requirement of a small indoor space, or a proper number of air purifiers can be sequentially connected according to the size of a large indoor space to purify the same space coordinately, synchronously, simultaneously and jointly.

Preferably, the male connecting assembly 1000 and the female connecting assembly 2000 are arranged on an upper side and a lower side of the shell assembly 100 respectively, so that a proper number of air purifiers can be sequentially stacked in the vertical direction in a large indoor space, and a stable and reliable mechanical, electrical and signal connection relation can be established between the air purifiers, thus effectively reducing the overall space occupied by the air purifiers and guaranteeing the collaborative purification efficiency and effect of the air purifiers in the same indoor space.

The above description is merely for explaining preferred embodiments of the application and is not intended to limit the application. Any modifications, equivalent substitutions and improvements made based on the spirit and principle of the application should also fall within the protection scope of the application.

What is claimed is:

1. An air purifier, comprising a shell assembly formed with a first receiving cavity, wherein multiple air inlets communicated with the first receiving cavity are formed in a back side of the shell assembly, and multiple air outlets communicated with the first receiving cavity are formed in a front side of the shell assembly; the air purifier further comprises a filter assembly, an air inflow guide assembly, a fan and a diffusion air outflow assembly which are sequentially arranged in the first receiving cavity from back to front, wherein, the filter assembly is able to purify air entering the first receiving cavity via the air inlets and flowing through the first receiving cavity, the air inflow guide assembly defines a guide channel between the filter assembly and the fan, the fan generates an air flow that flows into the first receiving cavity via the air inlets and sequentially flows through the filter assembly, the guide channel, the fan and the diffusion air outflow assembly, and the diffusion air outflow assembly is able to rotate to guide the air flow to the air outlets, enable the air flow to diffuse outwards and decrease a flow velocity of the air flow;

wherein the air inflow guide assembly comprises an air collection structure and a guide structure connected to a front side of the air collection structure, an air collection port leading to the filter assembly is formed in a front side of the air collection structure and has a sectional dimension becoming smaller gradually from front to back, a guide port communicated with the air collection port is formed in a front side of the guide structure and has a sectional dimension becoming larger gradually from back to front, and the air collection port and the guide port form the guide channel jointly.

2. The air purifier according to claim 1, wherein the diffusion air outflow assembly comprises a diffusion component connected to the fan and an extension component connected to a back side of the diffusion component, multiple diffusion ports which penetrate through the diffusion component and are distributed in a circular array are formed in the back side of the diffusion component, have a sectional dimension becoming larger gradually from back to front, and are able to change a flow direction of the air flow to decrease the flow velocity of the air flow and increase a pressure of the air flow, and extension ports which penetrate through the extension component and are connected to the diffusion ports are formed in a back side of the extension component, have a sectional dimension becoming larger gradually from back to front, and are used to guide the air flow to extend outwards to flow to the diffusion ports.

3. The air purifier according to claim 1, wherein a maximum sectional dimension of the guide port corresponds to a dimension of the fan.

4. The air purifier according to claim 1, further comprising an air detection assembly connected to the shell assembly and used for detecting the quality of air.

5. The air purifier according to claim 4, wherein the air detection assembly comprises a dust sensor, a volatile organic compounds (VOC) sensor, a temperature sensor, a humidity sensor, a formaldehyde sensor, a carbon monoxide sensor, a carbon dioxide sensor and/or an ozone sensor.

6. The air purifier according to claim 4, wherein a detection accommodating cavity for accommodating the air detection assembly is formed in a left side and/or right side of the shell assembly and has an access port communicated with an outside, and the air purifier further comprises an access door connected to the shell assembly and used for opening or closing the access port.

7. The air purifier according to claim 1, further comprising an ultraviolet sterilization component connected to the air inflow guide assembly and used for sterilizing the fan.

8. The air purifier according to claim 1, further comprising an anion generator and/or a plasma generator connected to the diffusion air outflow assembly.

9. The air purifier according to claim 1, wherein the shell assembly comprises a shell body and a back cover detachably connected to a back side of the shell body, the shell body has a first accommodating cavity which is open backwards and a second accommodating cavity which is located in front of the first accommodating cavity, the first accommodating cavity is used for accommodating the filter assembly, the second accommodating cavity is used for accommodating the air inflow guide assembly, the fan and the diffusion air outflow assembly and is communicated with the first accommodating cavity through the air inflow guide assembly, and the first accommodating cavity and the second accommodating cavity form the first receiving cavity jointly.

10. The air purifier according to claim 1, further comprising a male connecting assembly, wherein the male connecting assembly comprises:
a male base formed with a second receiving cavity and also formed, in a connecting direction, with a connecting hole and a male hole which are spaced apart from each other and penetrating through the second receiving cavity to an outside;
a male terminal made of a conducting material and located in the second receiving cavity; and
a link structure located in the second receiving cavity and provided with a first link part and a second link part, wherein the first link part is opposite to the connecting hole in the connecting direction; when an external connecting structure is disposed in the connecting hole, the first link part is pressed by the connecting structure to move away from the connecting hole to reach a connecting position, the second link part is linked with the first link part and drives, when the first link part moves to the connecting position, the male terminal to at least partially stretch out of the second receiving cavity via the male hole.

11. The air purifier according to claim 10, wherein the first link part and the second link part are connected and are able to rotate synchronously around a link axis, wherein the first link part and the second link part are arranged on two sides of the link axis respectively, and the second link part abut against a side, away from the male hole, of the male terminal.

12. The air purifier according to claim 10, wherein the male connecting assembly further comprises at least one connecting cover capable of sliding in the connecting hole in the connecting direction and at least one elastic part elastically connected between the connecting cover and a bottom of the connecting hole.

13. The air purifier according to claim 10, wherein the male base is further formed with an accommodating groove located beside the male hole, and the male connecting assembly further comprises a dust cover which is in a closed state or an open state; in the closed state, the dust cover covers the male hole and the accommodating groove; and in the open state, the dust cover opens the male hole and is accommodated in the accommodating groove.

14. The air purifier according to claim 10, wherein the male connecting assembly further comprises a male sensor for realizing signal connection, and the male sensor is a signal transmitter or a signal receiver.

15. The air purifier according to claim 14, further comprising a female connecting assembly matched with the male connecting assembly, wherein the female connecting assembly comprises:
a female base formed with a female hole opposite to the male hole in the connecting direction and provided with a connecting protrusion opposite to the connecting hole in the connecting direction, wherein the connecting protrusion is inserted into the connecting hole and is used to press the first link part to the connecting position;
a female terminal made of a conducting material, located in the female hole and electrically connected to the male terminal; and
a female sensor aligned to the male sensor in the connecting direction and in signal connection with the male sensor, wherein when the male sensor is the signal transmitter, the female sensor is the signal receiver; and when the male sensor is the signal receiver, the female sensor is the signal transmitter.

16. The air purifier according to claim 15, wherein the female sensor is an infrared sensor.

17. The air purifier according to claim 10, further comprising a female connecting assembly matched with the male connecting assembly, wherein the female connecting assembly comprises:
a female base formed with a female hole opposite to the male hole in the connecting direction and provided with a connecting protrusion opposite to the connecting hole in the connecting direction, wherein the connecting protrusion is inserted into the connecting hole and is used to press the first link part to the connecting position; and
a female terminal made of a conducting material, located in the female hole and electrically connected to the male terminal.

18. The air purifier according to claim 17, wherein the female terminal is electrically connected to an external electrical connector, the female base is formed with a wiring trough for guiding the external electrical connector, and the wiring trough is communicated with the female hole.

* * * * *